United States Patent
Wang et al.

(10) Patent No.: US 10,924,211 B2
(45) Date of Patent: Feb. 16, 2021

(54) NON-ORTHOGONAL DATA TRANSMISSION METHOD AND DEVICE

(71) Applicant: Huawei Technologies Co., Ltd., Shenzhen (CN)

(72) Inventors: Lei Wang, Shanghai (CN); Xiuqiang Xu, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/452,107

(22) Filed: Jun. 25, 2019

(65) Prior Publication Data

US 2019/0319743 A1    Oct. 17, 2019

Related U.S. Application Data

(63) Continuation of application No. PCT/CN2017/118175, filed on Dec. 25, 2017.

(30) Foreign Application Priority Data

Dec. 26, 2016 (CN) .......................... 201611215766.7

(51) Int. Cl.
  *H04L 1/00*    (2006.01)
  *H04L 5/00*    (2006.01)
  *H04L 27/36*   (2006.01)

(52) U.S. Cl.
  CPC .......... *H04L 1/0058* (2013.01); *H04L 1/0003* (2013.01); *H04L 1/0055* (2013.01);
  (Continued)

(58) Field of Classification Search
  CPC ............................ H04L 1/0058; H04L 1/0003
  See application file for complete search history.

(56) References Cited

U.S. PATENT DOCUMENTS

2001/0028684 A1  10/2001  Chung et al.
2008/0062857 A1* 3/2008  Monogioudis ...... H04L 27/2627
                                                  370/208
(Continued)

FOREIGN PATENT DOCUMENTS

CN    105472752 A    4/2016
CN    105610560 A    5/2016
(Continued)

OTHER PUBLICATIONS

Receiver Design for Downlink Non-Orthogonal Multiple Access (NOMA) Chunlin Yan†, Atsushi Harada‡, Anass Benjebbour‡, Yang Lan†, Anxin Li† and Huiling Jiang† †DOCOMO Beijing Communications Laboratories Co., Ltd. 5G Lab, NTT Docomo, Inc (Year: 2015).*

(Continued)

*Primary Examiner* — Deepa Belur
(74) *Attorney, Agent, or Firm* — Leydig, Voit & Mayer, Ltd.

(57) ABSTRACT

Embodiments of this application provide a data transmission method and device, so as to increase an uplink/downlink data transmission throughput. The method includes: splitting a to-be-transmitted transport block into N code blocks with incompletely equal sizes, where N is an integer greater than or equal to 2; performing error correction coding on the N code blocks to obtain N encoded bit blocks; and non-orthogonally transmitting the N encoded bit blocks by using resources that are the same in at least one dimension of a time domain, a frequency domain, a space domain, and a code domain.

14 Claims, 18 Drawing Sheets

(52) U.S. Cl.
CPC .......... *H04L 1/0061* (2013.01); *H04L 5/0016* (2013.01); *H04L 27/366* (2013.01)

(56) References Cited

U.S. PATENT DOCUMENTS

| | | |
|---|---|---|
| 2015/0098420 A1 | 4/2015 | Luo et al. |
| 2016/0119807 A1* | 4/2016 | Sun ...................... H04B 7/0452 370/252 |
| 2016/0269209 A1 | 9/2016 | Kim et al. |
| 2017/0135114 A1* | 5/2017 | Hwang ................... H04J 11/00 |
| 2017/0289979 A1* | 10/2017 | Xu ............................. H04L 1/06 |
| 2017/0353959 A1* | 12/2017 | Xu ............................. H04L 1/06 |
| 2019/0273576 A1* | 9/2019 | Zhang .................. H04L 5/0016 |
| 2020/0212973 A1* | 7/2020 | Lee ........................ H04J 13/16 |

FOREIGN PATENT DOCUMENTS

| | | |
|---|---|---|
| CN | 105612706 A | 5/2016 |
| JP | 2014204277 A | 10/2014 |
| JP | 2016539534 A | 12/2016 |
| WO | 2009039638 A1 | 4/2009 |
| WO | 2016092738 A1 | 6/2016 |
| WO | 2016127820 A1 | 8/2016 |

OTHER PUBLICATIONS

Xu et. all; Design of Non-Orthogonal multichannel sensor network; 2010 International Conference on Distributed Computing Systems; Hong Kong University of Science and Technology, 2010 IEEE (Year: 2010).*

Chunlin Yan, et. all; Receiver Design for Downlink Non-Orthogonal Multiple Access (NOMA); DOCOMO Beijing Communications Laboratories Co., Ltd.; IEEE 2015 (Year: 2015).*

Fan et al., "Rate and Power Allocation for 2-Level Superposition Coded Modulation Supporting Both Unicast and Multicast Traffic," XP032342853, pp. 1-5, Institute of Electrical and Electronics Engineers, New York, New York (2012).

* cited by examiner

NON-ORTHOGONAL DATA TRANSMISSION METHOD AND DEVICE

CROSS-REFERENCE TO RELATED APPLICATIONS

This application is a continuation of International Patent Application No. PCT/CN2017/118175, filed on Dec. 25, 2017, which claims priority to Chinese Patent Application No. 201611215766.7, filed on Dec. 26, 2016. The disclosures of the aforementioned applications are hereby incorporated by reference in their entireties.

TECHNICAL FIELD

Embodiments of this application relate to the communications field, and more specifically, to a non-orthogonal data transmission method and device.

BACKGROUND

Multiple access is one of core technologies at a physical layer of wireless communication, enables a wireless network device to distinguish between and serve a plurality of end users, and reduces multi-access interference.

A simple orthogonal multiple access mode is used in most existing wireless communications systems. However, as application scenarios, terminal types, and application types become increasingly rich, a quantity of terminals increases explosively during evolution of a future cellular network. The existing orthogonal multiple access mode cannot meet an increasing requirement of people for an increased cellular network capacity, for example, cannot meet massive accesses and continuous improvement of uplink/downlink data transmission and spectrum efficiency.

With constant deepening of the study and application of a non-orthogonal multiple access technology, people expect that a problem of an increase in a capacity requirement, especially a problem of an increase in an uplink/downlink data transmission throughput requirement, can be resolved effectively for future wireless cellular networks such as fifth generation (5th generation, 5G) mobile communications systems by using the non-orthogonal multiple access technology.

SUMMARY

Embodiments of this application provide a non-orthogonal data transmission method and device, so as to increase an uplink/downlink data transmission throughput.

According to a first aspect, an embodiment of this application provides a non-orthogonal data transmission method, including: splitting a to-be-transmitted transport block into N code blocks with incompletely equal sizes, where N is an integer greater than or equal to 2; performing error correction coding on the N code blocks to obtain N encoded bit blocks; and non-orthogonally transmitting the N encoded bit blocks by using resources that are the same in at least one dimension of a time domain, a frequency domain, a space domain, and a code domain.

Therefore, in this embodiment of this application, during non-orthogonal data transmission, the to-be-transmitted block is split into the N code blocks with incompletely equal sizes, and error correction coding with different error correction capabilities is performed on the N code blocks, so that performance of all the code blocks is different, and a receive end can gradually demodulate data more easily in an interference cancellation manner, thereby increasing an uplink/downlink data transmission throughput.

Optionally, in an implementation of the first aspect, the non-orthogonally transmitting the N encoded bit blocks includes: mapping the N encoded bit blocks onto M bit streams, where M is an integer greater than or equal to 1; modulating the M bit streams to obtain M to-be-transmitted symbol streams, where quantities of modulation symbols included in all of the M to-be-transmitted symbol streams are equal; superposing the M to-be-transmitted symbol streams to obtain a superposed symbol stream; and non-orthogonally transmitting the superposed symbol stream.

Optionally, the superposed symbol stream is non-orthogonally transmitted by using the resources that are the same in the at least one dimension of the time domain, the frequency domain, the space domain, and the code domain.

Optionally, in an implementation of the first aspect, the mapping the N encoded bit blocks onto M bit streams includes: pseudorandomly mapping the N encoded bit blocks onto the M bit streams.

Optionally, in an implementation of the first aspect, the pseudorandomly mapping the N encoded bit blocks onto the M bit streams includes: pseudorandomly mapping the N encoded bit blocks onto at least two of the M bit streams after each of the N encoded bit blocks is split; or pseudorandomly mapping the N encoded bit blocks onto at least two of the M bit streams after at least two of the N encoded bit blocks are combined.

Optionally, in an implementation of the first aspect, the mapping the N encoded bit blocks onto M bit streams includes: sequentially mapping the N encoded bit blocks onto the M bit streams according to an arrangement sequence of the N encoded bit blocks and/or an arrangement sequence of bits in each of the N encoded bit blocks.

Optionally, in an implementation of the first aspect, the modulating the M bit streams to obtain M to-be-transmitted symbol streams includes: modulating a first bit stream in the M bit streams through quadrature amplitude modulation and/or phase shift modulation, to obtain the M to-be-transmitted symbol streams.

Optionally, in an implementation of the first aspect, when the first bit stream in the M bit streams is modulated through quadrature amplitude modulation and/or phase shift modulation, a size of an $i^{th}$ encoded bit block $EB_i$ in the N encoded bit blocks is:

$EB_i$=a total quantity of time-frequency resources× $\log_2(X)$, where X represents an order of modulation performed on the first bit stream.

Optionally, in an implementation of the first aspect, the modulating the M bit streams to obtain M to-be-transmitted symbol streams includes: performing multidimensional modulation on a second bit stream in the M bit streams by using a codebook, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, in an implementation of the first aspect, when multidimensional modulation is performed on the second bit stream in the M bit streams by using the codebook, a size of an $i^{th}$ encoded bit block $EB_i$ in the N encoded bit blocks is:

$EB_i$=a total quantity of time-frequency resources/F× k×$\log_2(X)$, where F represents a spreading factor, k represents a quantity of bit streams occupied by each encoded bit block, and X represents an order of modulation performed on the second bit stream.

Optionally, in an implementation of the first aspect, modulation schemes of the N code blocks are not completely the same.

Optionally, in an implementation of the first aspect, the performing error correction coding on the N code blocks to obtain N encoded bit blocks includes: performing error correction coding on the N code blocks by using incompletely same code rates, to obtain the N encoded bit blocks.

Optionally, in an implementation of the first aspect, error correction coding is performed on each of the N code blocks to obtain the N encoded bit blocks, where error correction coding is performed in any one of the following encoding manners: Turbo coding, polar coding, and low-density parity-check coding.

Optionally, in an implementation of the first aspect, when error correction coding is performed on each of the N code blocks through polar coding, a size of each of the N encoded bit blocks is a power of 2.

According to a second aspect, an embodiment of this application provides a non-orthogonal data transmission method, including: splitting a to-be-transmitted transport block into N code blocks, where N is an integer greater than or equal to 2; performing error correction coding on the N code blocks to obtain N encoded bit blocks; pseudo-randomly mapping the N encoded bit blocks onto M bit streams, where M is an integer greater than or equal to 1; modulating the M bit streams to obtain M to-be-transmitted symbol streams, where quantities of modulation symbols included in all of the M to-be-transmitted symbol streams are equal; superposing the M to-be-transmitted symbol streams to obtain a superposed symbol stream; and non-orthogonally transmitting the superposed symbol stream.

Optionally, the superposed symbol stream is non-orthogonally transmitted by using at least one of same time domain resources, frequency domain resources, space domain resources, and code domain resources.

Therefore, in this embodiment of this application, during non-orthogonal data transmission, the N encoded bit blocks are pseudorandomly mapped onto the M bit streams, so that performance of all the bit streams is different, thereby increasing an uplink/downlink data transmission throughput.

Optionally, in an implementation of the second aspect, the pseudorandomly mapping the N encoded bit blocks onto the M bit streams includes: pseudorandomly mapping the N encoded bit blocks onto at least two of the M bit streams after each of the N encoded bit blocks is split; or pseudo-randomly mapping the N encoded bit blocks onto at least two of the M bit streams after at least two of the N encoded bit blocks are combined.

Optionally, in an implementation of the second aspect, the modulating the M bit streams to obtain M to-be-transmitted symbol streams includes: modulating a first bit stream in the M bit streams through quadrature amplitude modulation and/or phase shift modulation, to obtain the M to-be-transmitted symbol streams.

Optionally, in an implementation of the second aspect, when the first bit stream in the M bit streams is modulated through quadrature amplitude modulation and/or phase shift modulation, a size of an $i^{th}$ encoded bit block $EB_i$ in the N encoded bit blocks is:

$$EB_i = \text{a total quantity of time-frequency resources} \times \log_2(X),$$

where X represents an order of modulation performed on the first bit stream.

Optionally, in an implementation of the second aspect, the modulating the M bit streams to obtain M to-be-transmitted symbol streams includes: performing multidimensional modulation on a second bit stream in the M bit streams by using a codebook, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, in an implementation of the second aspect, when multidimensional modulation is performed on the second bit stream in the M bit streams by using the codebook, a size of an $i^{th}$ encoded bit block $EB_i$ in the N encoded bit blocks is:

$$EB_i = \text{a total quantity of time-frequency resources}/F \times k \times \log_2(X),$$

where F represents a spreading factor, k represents a quantity of bit streams occupied by each encoded bit block, and X represents an order of modulation performed on the second bit stream.

Optionally, in an implementation of the second aspect, modulation schemes of the N code blocks are not completely the same.

Optionally, in an implementation of the second aspect, error correction coding is performed on each of the N code blocks to obtain the N encoded bit blocks, where error correction coding is performed in any one of the following encoding manners: a Turbo code, a polar code, and a low-density parity-check code.

Optionally, in an implementation of the second aspect, when error correction coding is performed on each of the N code blocks through polar coding, a size of each of the N encoded bit blocks is a power of 2.

According to a third aspect, an embodiment of this application provides a non-orthogonal data transmission method, including: obtaining a received signal by using resources that are the same in at least one dimension of a time domain, a frequency domain, a space domain, and a code domain; obtaining N encoded bit blocks by demodulating the received signal, where N is an integer greater than or equal to 2; performing error correction decoding on the N encoded bit blocks to obtain N code blocks with incompletely same sizes; and combining the N code blocks to obtain a transport block.

Therefore, in this embodiment of this application, during non-orthogonal data transmission, the N code blocks with incompletely same sizes are obtained through decoding, so that data is demodulated more easily in an interference cancellation manner, thereby increasing an uplink/downlink data transmission throughput.

Optionally, in an implementation of the third aspect, the obtaining N encoded bit blocks by demodulating the received signal includes: obtaining the received signal, where the received signal includes a superposed symbol stream; evenly splitting the superposed symbol stream to obtain M symbol streams, where quantities of symbols included in all of the M symbol streams are equal, and M is an integer greater than or equal to 1; demodulating the M symbol streams to obtain M bit streams; and demapping the M bit streams to obtain the N encoded bit blocks, where N is an integer greater than or equal to 2.

Optionally, in an implementation of the third aspect, the demapping the M bit streams to obtain N encoded bit blocks includes:
pseudorandomly demapping bits in the M bit streams to obtain the N encoded bit blocks.

Optionally, in an implementation of the third aspect, the demapping the M bit streams to obtain N encoded bit blocks includes:
sequentially demapping bits in the M bit streams to obtain the N encoded bit blocks.

Optionally, in an implementation of the third aspect, the demodulating the M symbol streams to obtain M bit streams includes: demodulating the M symbol streams through quadrature amplitude demodulation and/or phase shift demodulation, to obtain the M bit streams.

Optionally, in an implementation of the third aspect, the demodulating the M symbol streams to obtain M bit streams includes:
demodulating the M symbol streams by using a codebook, to obtain the M bit streams, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, in an implementation of the third aspect, demodulation schemes of the M symbol streams are not completely the same.

Optionally, in an implementation of the third aspect, error correction decoding is performed on the N encoded bit blocks by using incompletely same code rates, to obtain the N code blocks with incompletely same sizes.

Optionally, in an implementation of the third aspect, error correction decoding is performed in any one of the following decoding manners: Turbo decoding, polar decoding, and low-density parity-check decoding.

According to a fourth aspect, an embodiment of this application provides a non-orthogonal data transmission method, including: receiving a superposed symbol stream; evenly splitting the superposed symbol stream to obtain M symbol streams, where quantities of symbols included in all of the M symbol streams are equal, and M is an integer greater than or equal to 1; demodulating the M symbol streams to obtain M bit streams; pseudorandomly demapping the M bit streams to obtain N encoded bit blocks, where N is an integer greater than or equal to 2; performing error correction decoding on the N encoded bit blocks to obtain N code blocks; and combining the N code blocks to obtain a transport block.

Therefore, in this embodiment of this application, during non-orthogonal data transmission, bit streams with different performance are obtained, so that data is demodulated more easily in an interference cancellation manner, thereby increasing an uplink/downlink data transmission throughput.

Optionally, in an implementation of the fourth aspect, the demodulating the M symbol streams to obtain M bit streams includes: demodulating the M symbol streams through quadrature amplitude demodulation and/or phase shift demodulation, to obtain the M bit streams.

Optionally, in an implementation of the fourth aspect, the demodulating the M symbol streams to obtain M bit streams includes:
demodulating the M symbol streams by using a codebook, to obtain the M bit streams, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, in an implementation of the fourth aspect, demodulation schemes of the M symbol streams are not completely the same.

Optionally, in an implementation of the fourth aspect, error correction decoding is performed on the N encoded bit blocks to obtain the N code blocks, where error correction decoding is performed in any one of the following decoding manners: a Turbo code, a polar code, and a low-density parity-check code.

According to a fifth aspect, an embodiment of this application provides a non-orthogonal data transmission device, including: a splitting unit, a coding unit, and a transmission unit that are capable of performing the method in any one of the first aspect or the optional implementations of the first aspect.

According to a sixth aspect, an embodiment of this application provides a non-orthogonal data transmission device, including: a splitting unit, a coding unit, a mapping unit, a modulation unit, a symbol stream processing unit, and a transmission unit that are capable of performing the method in any one of the second aspect or the optional implementations of the second aspect.

According to a seventh aspect, an embodiment of this application provides a non-orthogonal data transmission device, including: an obtaining unit, a processing unit, a decoding unit, and a combination unit that are capable of performing the method in any one of the third aspect or the optional implementations of the third aspect.

According to an eighth aspect, an embodiment of this application provides a non-orthogonal data transmission device, including: a receiving unit, a symbol stream processing unit, a demodulation unit, a demapping unit, a decoding unit, and a combination unit that are capable of performing the method in any one of the fourth aspect or the optional implementations of the fourth aspect.

According to a ninth aspect, a non-orthogonal data transmission device is provided, including: a memory, a transceiver, and a processor. The memory stores program code that can be used to instruct to perform any one of the first aspect or the optional implementations of the first aspect; and when the code is executed, the processor can implement operations performed by a transmit end device in the method.

According to a tenth aspect, a non-orthogonal data transmission device is provided, including: a memory, a transceiver, and a processor. The memory stores program code that can be used to instruct to perform any one of the second aspect or the optional implementations of the second aspect; and when the code is executed, the processor can implement operations performed by a transmit end device in the method.

According to an eleventh aspect, a non-orthogonal data transmission device is provided, including: a memory, a transceiver, and a processor. The memory stores program code that can be used to instruct to perform any one of the third aspect or the optional implementations of the third aspect; and when the code is executed, the processor can implement operations performed by a transmit end device in the method.

According to a twelfth aspect, a non-orthogonal data transmission device is provided, including: a memory, a transceiver, and a processor. The memory stores program code that can be used to instruct to perform any one of the fourth aspect or the optional implementations of the fourth aspect; and when the code is executed, the processor can implement operations performed by a receive end device in the method.

According to a thirteenth aspect, a computer storage medium is provided, where the computer storage medium stores program code, and the program code can be used to instruct to perform the method according to any one of the first aspect or the optional implementations of the first aspect.

According to a fourteenth aspect, a computer storage medium is provided, where the computer storage medium stores program code, and the program code can be used to instruct to perform the method according to any one of the second aspect or the optional implementations of the second aspect.

According to a fifteenth aspect, a computer storage medium is provided, where the computer storage medium stores program code, and the program code can be used to instruct to perform the method according to any one of the third aspect or the optional implementations of the third aspect.

According to a sixteenth aspect, a computer storage medium is provided, where the computer storage medium stores program code, and the program code can be used to instruct to perform the method according to any one of the fourth aspect or the optional implementations of the fourth aspect.

DESCRIPTION OF EMBODIMENTS

The following describes technical solutions in the embodiments of this application with reference to accompanying drawings.

Figure 1:
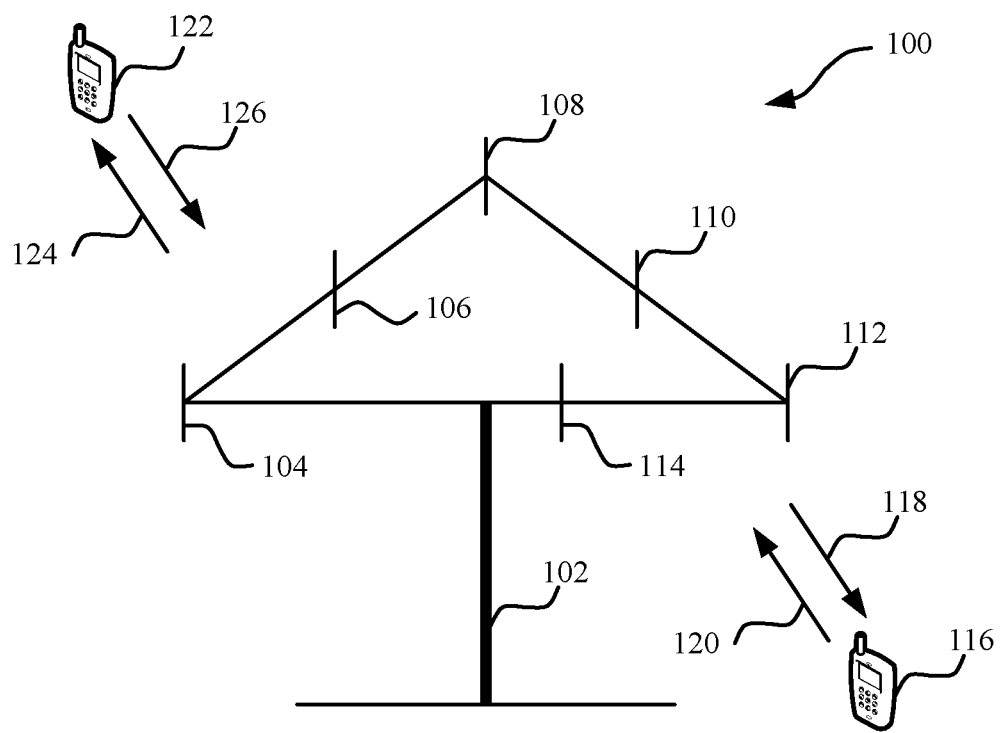
FIG. 1 is a schematic diagram of a communications system for non-orthogonal data transmission to which this application is applied.

FIG. 1 is a schematic diagram of a communications system for non-orthogonal data transmission to which this application is applied. As shown in FIG. 1, the communications system 100 includes a network device 102, and the network device 102 may include a plurality of antennas such as antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components that are related to signal transmission and reception (such as a processor, a modulator, a multiplexer, a demodulator, a demultiplexer, or an antenna).

The network device 102 may communicate with a plurality of terminal devices (such as a terminal device 116 and a terminal device 122). However, it can be understood that the network device 102 may communicate with any quantity of terminal devices similar to the terminal device 116 or 122. The terminal devices 116 and 122 may be cellular phones, smartphones, portable computers, handheld communications devices, handheld computing devices, satellite radio apparatuses, global positioning systems, PDAs, and/or any other appropriate devices that are configured to perform communication in the wireless communications system 100.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, different frequency bands may be used on the forward link 118 and the reverse link 120, and different frequency bands may be used on the forward link 124 and the reverse link 126.

For another example, in a time division duplex (TDD) system or a full duplex system, a same frequency band may be used on the forward link 118 and the reverse link 120, and a same frequency band may be used on the forward link 124 and the reverse link 126.

Each antenna (or each antenna group including a plurality of antennas) and/or each region designed for communication are/is referred to as a sector of the network device 102. For example, an antenna group may be designed to communicate with a terminal device that is in a sector of a coverage area of the network device 102. In a process in which the network device 102 communicates with the terminal devices 116 and 122 through the forward links 118 and 124 respectively, transmit antennas of the network device 102 may increase signal-to-noise ratios of the forward links 118 and 124 through beamforming. In addition, compared with a manner in which a network device uses a single antenna to send signals to all terminal devices served by the network device, when the network device 102 sends signals to the terminal devices 116 and 122 that are randomly scattered in the related coverage area through beamforming, a mobile device in a neighboring cell receives less interference.

Within a given time, the network device 102, the terminal device 116, or the terminal device 122 may be a wireless communications sending apparatus and/or a wireless communications receiving apparatus. When sending data, the wireless communication sending apparatus may encode the data for transmission. Specifically, the wireless communication sending apparatus may obtain (for example, generate, receive from another communications apparatus, or store in a memory) a specific quantity of data bits to be sent to the wireless communication receiving apparatus through a channel. Such data bits may be included in a data transport block (or a plurality of transport blocks), and the transport block may be segmented to generate a plurality of code blocks.

In addition, the communications system 100 may be a public land mobile network (PLMN), a device-to-device (D2D) network, a machine-to-machine (M2M) network, or another network. FIG. 1 is merely a simplified schematic diagram used as an example. The network may further include another network device that is not graphed in FIG. 1.

A transmit end (a receive end) in the embodiments of this application may be a network device. The network device may be a device that communicates with a terminal device. For example, the network device may be a network device controller. Each network device may provide communication coverage to a particular geographical area, and may communicate with a terminal device located in this coverage area (a cell). The network device may be a network device (such as a base transceiver station (BTS)) in a Global System for Mobile Communications (GSM) or a Code Division Multiple Access (CDMA) system, may be a network device (NodeB, NB) in a Wideband Code Division Multiple Access (WCDMA) system, or may be an evolved network device (Evolved NodeB, eNB, or eNodeB) in an LTE system, or may be a wireless controller in a cloud radio access network (CRAN). Alternatively, the network device may be a network device in a future 5G network, a network device in a future evolved public land mobile network (PLMN), or the like.

A receive end (a transmit end) in the embodiments of this application may be a terminal device. The terminal device may be an access terminal, a user equipment (UE), a subscriber unit, a subscriber station, a mobile station, a remote station, a remote terminal, a mobile terminal, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in the Internet of Things, a virtual reality device, a terminal device in a future 5G network, a terminal device in a future evolved public land mobile network (PLMN), or the like.

A non-orthogonal data transmission method and device according to the embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more types of computer operating systems implementing service processing by using a process, such as a Linux operating system, a Unix operating system, an Android operating system, an iOS operating system, or a Windows operating system. The application layer includes applications such as a browser, a contact list, word processing software, and instant messaging software. In addition, in the embodiments of this application, a specific structure of an execution body of a data transmission method is not particularly limited in this application, provided that communication can be performed based on the data transmission method in the embodiments of this application by running a program that records code for the data transmission method in the embodiments of this application. For example, an execution body of the data transmission method in the embodiments of this application may be a terminal device or a network device, or may be a function module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer readable medium may include but is not limited to: a magnetic storage component (such as a hard disk, a floppy disk, or a magnetic tape), an optical disc (such as a compact disc (CD), a digital versatile disc (DVD), a smart card, and a flash memory device (such as erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

It should be noted that in the communications system 100 to which the non-orthogonal data transmission method and device in the embodiments of this application are applied, a plurality of terminal devices can perform data transmission with a network device by using a same time-frequency resource. In addition, for example, in time-frequency resource division performed by using a resource element (RE) as a unit, the time-frequency resource may be a time-frequency resource block (which may also be referred to as a time-frequency resource group) including a plurality of REs. In addition, locations of the plurality of REs may be the same in time domain (that is, corresponding to a same symbol) and may differ in frequency domain (that is, corresponding to different subcarriers); or locations of the plurality of REs may differ in time domain (that is, corresponding to different symbols) and may be the same in frequency domain (that is, corresponding to a same subcarrier). This is not particularly limited in this application.

Figure 2:
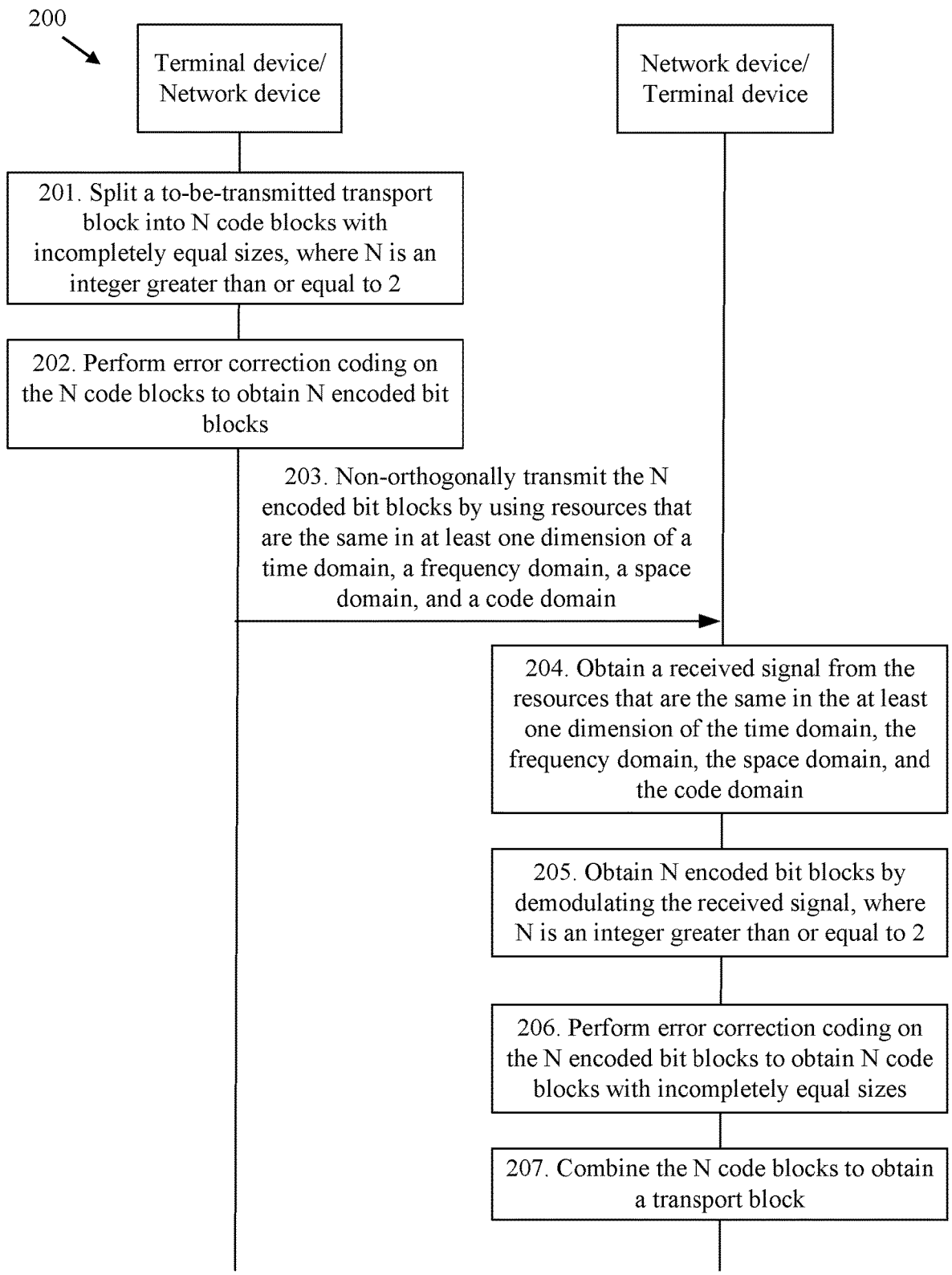
FIG. 2 is a schematic flowchart of a non-orthogonal data transmission method according to an embodiment of this application.

FIG. 2 is a schematic flowchart of a non-orthogonal data transmission method 200 according to an embodiment of this application. As shown in FIG. 2, the method 200 includes the following content.

In step 201, a to-be-transmitted transport block is split into N code blocks with incompletely equal sizes, where N is an integer greater than or equal to 2.

Optionally, the N code blocks may be code blocks of different sizes.

Figure 3:
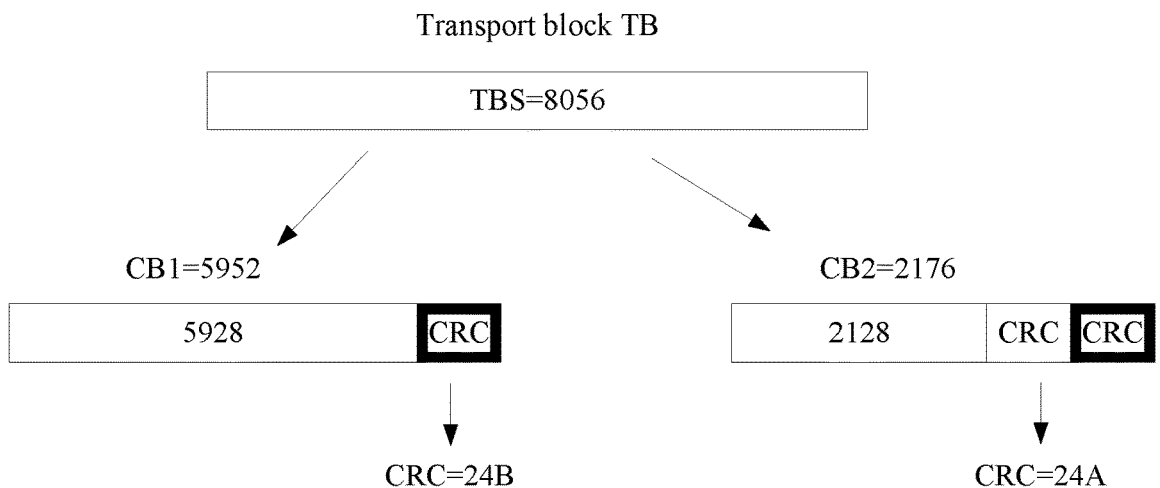
FIG. 3 is a schematic diagram of splitting a transport block according to an embodiment of this application.

For example, as shown in FIG. 3, for a transport block (TB) whose size is 8056 bits, that is, a transport block size (TBS) of 8056 bits, the TB is split into two code blocks (CBs): a CB1 and a CB2, respectively. During the splitting of the TB, a parity bit is configured for data bits generated after the TB is split, that is, a cyclic redundancy check (CRC) code is configured. Sizes of the CB1 and the CB2 include a value of the CRC code. A size of the CB1 is 5952 bits, and the CB1 includes 24-bit class-B CRC code. A size of the CB2 is 2176 bits, and the CB2 includes 24-bit class-A CRC code and the 24-bit class-B CRC code.

Optionally, there may be some code blocks of a same size in the N code blocks.

Figure 4:
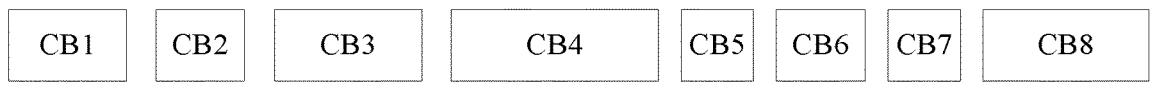
FIG. 4 is another schematic diagram of splitting a transport block according to an embodiment of this application.

For example, as shown in FIG. 4, a to-be-transmitted block is split into eight code blocks. A CB2 and a CB6 are the same in size, a CB5 and a CB7 are the same in size, and a CB1, the CB2, a CB3, a CB4, the CB5, and a CB8 are different in size.

In step 202, error correction coding is performed on the N code blocks to obtain N encoded bit blocks.

Optionally, error correction coding may be performed on each of the N code blocks in an encoding manner, for example, by using Turbo coding, polar coding, or low-density parity-check coding, to obtain the N encoded bit blocks.

Optionally, error correction coding may be performed on the N code blocks in a plurality of encoding manners.

Optionally, error correction coding is performed on the N code blocks by using incompletely same code rates, to obtain the N encoded bit blocks.

Optionally, sizes of the N code blocks are not completely the same, and the code rates used when error correction coding is performed on the N code blocks is also not completely the same. This embodies that error correction coding with different error correction capabilities is performed on the N code blocks.

Optionally, during non-orthogonal transmission, if a plurality of superposed data streams can have different error correction capabilities, a receive end may gradually demodulate data more easily in an interference cancellation manner.

Optionally, during error correction coding performed on a code block by using a Turbo code, error correction coding is first performed on the code block, and rate matching is performed on bits obtained after error correction coding is performed, to obtain the N encoded bit blocks.

Optionally, when error correction coding is performed on a code block by using polar coding, a size of an encoded bit block is a power of 2.

In step 203, the N encoded bit blocks are non-orthogonally transmitted by using resources that are the same in at least one dimension of a time domain, a frequency domain, a space domain, and a code domain.

Optionally, the same resources may be any type of resource of time domain resources, frequency domain resources, space domain resources, and code domain resources.

Optionally, the same resources may be a plurality of types of resources of time domain resources, frequency domain resources, space domain resources, and code domain resources.

Optionally, the N encoded bit blocks are combined and non-orthogonally transmitted on the resources that are the same in the at least one dimension.

Optionally, the N encoded bit blocks are mapped onto M bit streams, where M is an integer greater than or equal to 1; the M bit streams are modulated to obtain M to-be-transmitted symbol streams, where quantities of modulation symbols in the M to-be-transmitted symbol streams are equal; the M to-be-transmitted symbol streams are superposed to obtain a superposed symbol stream; and the superposed symbol stream is non-orthogonally transmitted.

Optionally, the superposed symbol stream is non-orthogonally transmitted by using the resources that are the same in the at least one dimension of the time domain, the frequency domain, the space domain, and the code domain.

Optionally, a first bit stream in the M bit streams is modulated through quadrature amplitude modulation and/or phase shift modulation, to obtain the M to-be-transmitted symbol streams.

Optionally, the first bit stream may be some of the M bit streams, or may be all of the M bit streams.

It should be understood that modulating the first bit stream in the M bit streams is modulating bits in the first bit stream.

Optionally, when the first bit stream in the M bit streams is modulated through quadrature amplitude modulation and/or phase shift modulation, a size of an $i^{th}$ encoded bit block (EB) $EB_i$ in the N encoded bit blocks may be obtained according to the following formula 1:

$$EB_i = \text{a total quantity of time-frequency resources} \times \log_2(X) \qquad \text{Formula 1}$$

where X represents an order of modulation performed on the first bit stream.

Optionally, the total quantity of time-frequency resources has been obtained when data transmission is performed.

Optionally, the order of modulation performed on the first bit stream has been obtained when a modulation scheme is determined.

Optionally, the order of modulation performed on the first bit stream may be 4, 16, 64, and 256.

Figure 5:
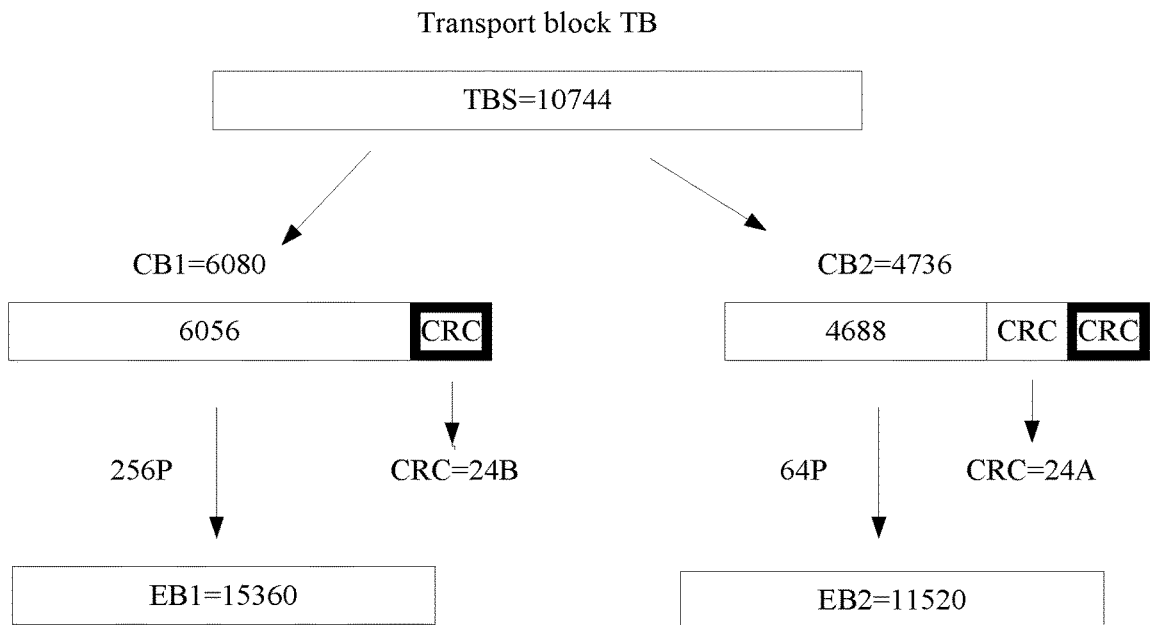
FIG. 5 is a schematic diagram of encoding in a modulation scheme according to an embodiment of this application.

For example, as shown in FIG. 5, for a TB whose size is 10744 bits (that is, a TBS is 10744 bits), the TB is split into two CBs: a CB1 and a CB2, respectively. A size of the CB1 is 6080 bits, and a size of the CB2 is 4736 bits. According to the formula 1, an EB is obtained after a CB is encoded. During this period, the total quantity of time-frequency resources is 1920. An EB1 is obtained after the CB1 is encoded; in this case, an order X of modulation performed on the EB1 is 256, and a size of the EB1 is 15360 bits. An EB2 is obtained after the CB2 is encoded; in this case, an order X of modulation performed on the EB2 is 64, and a size of the EB2 is 11520 bits.

Optionally, multidimensional modulation is performed on a second bit stream in the M bit streams by using a codebook, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, the second bit stream may be some of the M bit streams, or may be all of the M bit streams.

It should be understood that modulating the second bit stream in the M bit streams is modulating bits in the second bit stream.

Optionally, the codebook may be a sparse code multiple access (SCMA) codebook.

SCMA is a non-orthogonal multiple access technology. In the technology, a plurality of different data streams are transmitted on a same resource element (that is, the same resource element is used for the plurality of different data streams) by using codebooks, where different codebooks are used for the different data streams. Therefore, resource utilization is improved. The data streams may come from same user equipment, or may come from different user equipments.

The codebook used in SCMA is a set of two or more than two code words.

The code word may be represented as a multidimensional complex vector of two or more than two dimensions, and is used to represent mapping relationships between data and two or more than two modulation symbols. The modulation symbols include at least one zero modulation symbol and at least one non-zero modulation symbol, and the data may be binary bit data or multivariate data.

The codebook includes two or more than two code words, and the code words may be different from each other. The codebook may represent a mapping relationship between a possible data combination of data of a specific length and a code word in the codebook.

A code word used in SCMA may have sparsity to some extent. For example, a quantity of zero elements in the code word may be not less than a quantity of non-zero elements, so that a receive end can use a multi-user detection technology to perform decoding with relatively low complexity. Herein, the relationship between the quantity of zero elements and the quantity of non-zero elements that is enumerated above is merely an example description of sparsity. The present disclosure is not limited thereto. A proportion of the quantity of zero elements to the quantity of non-zero elements may be set at random.

In the SCMA technology, data in a data stream is directly mapped onto a code word, that is, a multidimensional complex vector, in a codebook according to a specific mapping relationship, to implement extended sending of the data over a plurality of resource elements. The data herein may be binary bit data or multivariate data. The plurality of resource elements may be resource elements in a time domain, a frequency domain, a space domain, a time-frequency domain, a time-space domain, or a time-frequency-space domain. It should be understood that SCMA is only a name, and another name may alternatively be used in the industry to represent the technology.

Optionally, when multidimensional modulation is performed on the second bit stream in the M bit streams by using the codebook, a size of an $i^{th}$ encoded bit block $EB_i$ in the N encoded bit blocks may be obtained according to the following formula 2:

$$EB_i = \text{a total quantity of time-frequency resources}/F \times k \times \log_2(X) \quad \text{Formula 2}$$

where F represents a spreading factor, k represents a quantity of bit streams occupied by each encoded bit block, and X represents an order of modulation performed on the second bit stream.

Optionally, the total quantity of time-frequency resources has been obtained when data transmission is performed.

Optionally, the order of modulation performed on the second bit stream has been obtained when a modulation scheme is determined.

Optionally, the spreading factor F is an optimization parameter used in the SCMA technology.

Optionally, the quantity k of bit streams occupied by each encoded bit block EB may be determined based on a mapping relationship of the EB. The EB may be mapped sequentially or pseudorandomly.

Optionally, the order X of modulation performed on the second bit stream may be an SCMA modulation order, and the order may be 4, 16, 64, and 256.

Figure 6:
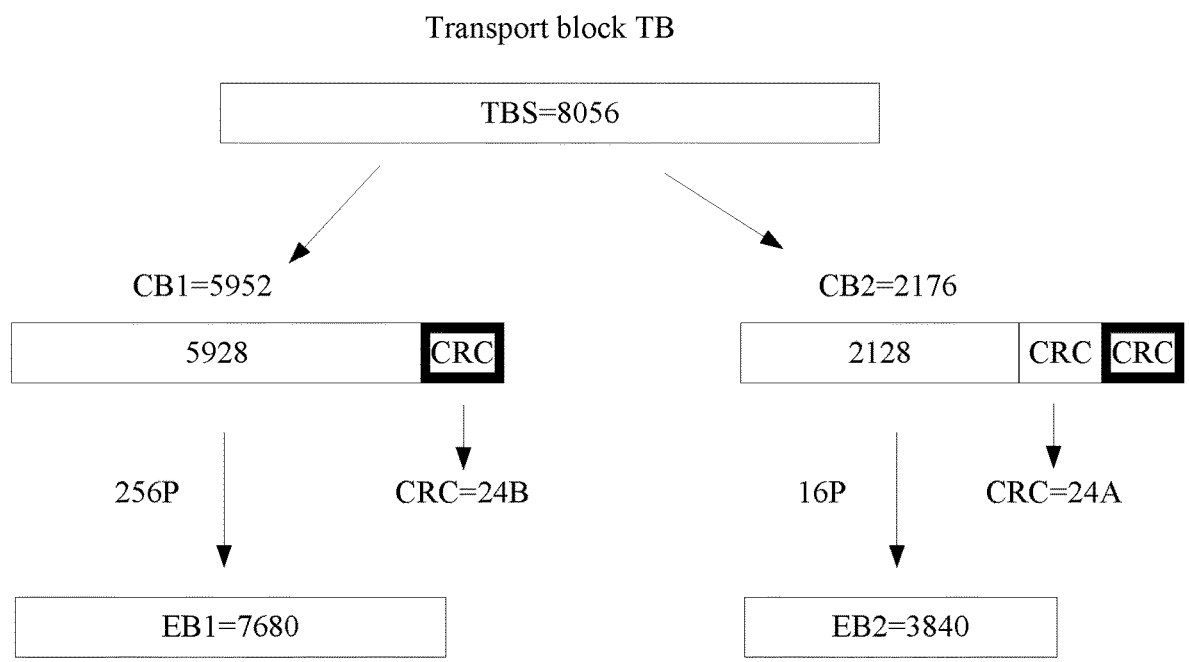
FIG. 6 is a schematic diagram of encoding in another modulation scheme according to an embodiment of this application.

For example, as shown in FIG. 6, for a TB whose size is 8056 bits (that is, a TBS is 8056 bits), the TB is split into two CBs: a CB1 and a CB2, respectively. A size of the CB1 is 5952 bits, and a size of the CB2 is 2176 bits. According to the formula 2, an encoded bit block (EB) is obtained after a CB is encoded. During this period, the total quantity of time-frequency resources is 1920, the spreading factor F is 4, and the quantity k of bit streams occupied by each encoded bit block is 2. An EB1 is obtained after the CB1 is encoded; in this case, an order X of modulation performed on the EB1 is 256, and a size of the EB1 is 7680 bits. An EB2 is obtained after the CB2 is encoded; in this case, an order X of modulation performed on the EB2 is 16, and a size of the EB2 is 3840 bits.

Optionally, the N encoded bit blocks are pseudorandomly mapped onto the M bit streams.

Optionally, the N encoded bit blocks are pseudorandomly mapped onto at least two of the M bit streams after each of the N encoded bit blocks is split.

Figure 7:
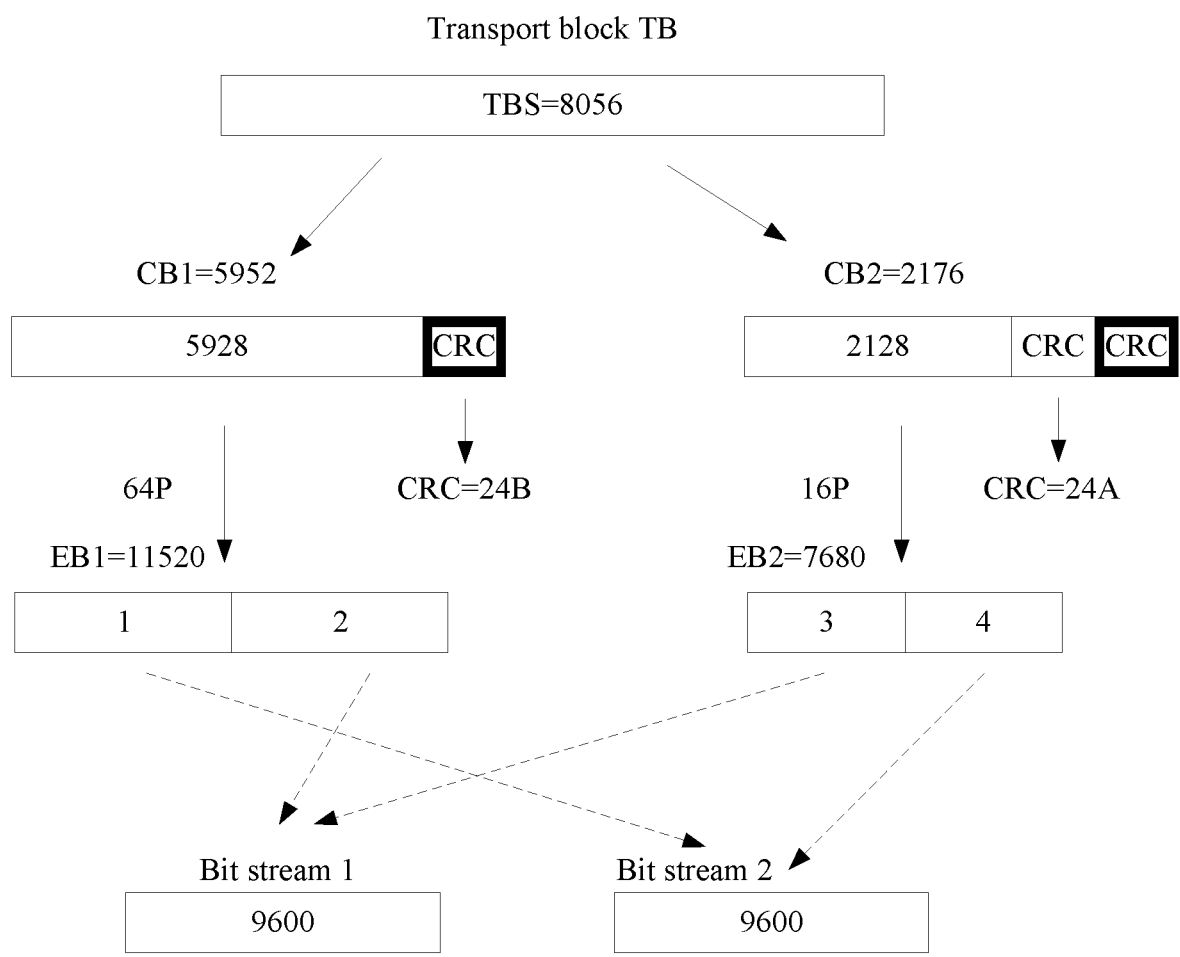
FIG. 7 is a schematic diagram of pseudorandomly mapping an encoded bit block in a modulation scheme according to an embodiment of this application.

For example, when the first bit stream in the M bit streams is modulated through quadrature amplitude modulation and/or phase shift modulation, as shown in FIG. 7, for a TB whose size is 8056 bits (that is, a TBS is 8056 bits), the TB is split into two CB: a CB1 and a CB2, respectively. A size of the CB1 is 5952 bits, and a size of the CB2 is 2176 bits. According to the formula 1, an EB is obtained after a CB is encoded. During this period, the total quantity of time-frequency resources is 1920. An EB1 is obtained after the CB1 is encoded; in this case, an order X of modulation performed on the EB1 is 64, and a size of the EB1 is 11520 bits. An EB2 is obtained after the CB2 is encoded; in this case, an order X of modulation performed on the EB2 is 16, and a size of the EB2 is 7680 bits. The EB1 is evenly split into two sub-bit blocks that are respectively labeled as a sub-bit block 1 and a sub-bit block 2 according to a splitting sequence, and the sub-bit block 1 and the sub-bit block 2 are randomly mapped onto a bit stream 2 and a bit stream 1. The EB2 is evenly split into two sub-bit blocks that are respectively labeled as a sub-bit block 3 and a sub-bit block 4 according to a splitting sequence, and the sub-bit block 3 and the sub-bit block 4 are randomly mapped onto the bit stream 1 and the bit stream 2. A bit size of the bit stream 1 is 9600 bits, and a bit size of the bit stream 2 is 9600 bits.

Figure 8:
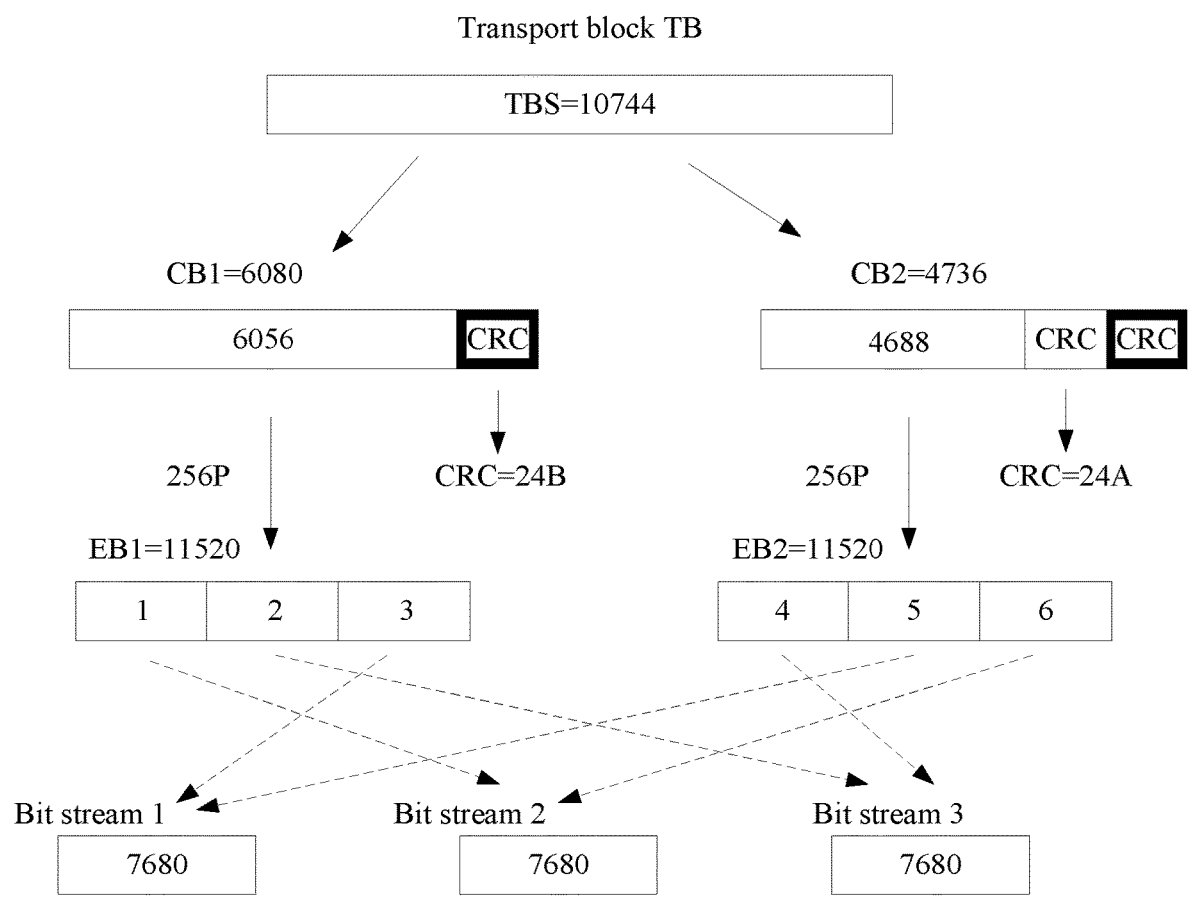
FIG. 8 is a schematic diagram of pseudorandomly mapping an encoded bit block in another modulation scheme according to an embodiment of this application.

For example, when multidimensional modulation is performed on the second bit stream in the M bit streams, as shown in FIG. 8, for a TB whose size is 10744 bits (that is, a TBS is 10744 bits), the TB is unevenly split into two CBs: a CB1 and a CB2, respectively. A size of the CB1 is 6080 bits, and a size of the CB2 is 4736 bits. According to the formula 2, an EB is obtained after a CB is encoded. During this period, the total quantity of time-frequency resources is 1920, the spreading factor F is 4, and the quantity k of bit streams occupied by each encoded bit block is 3. An EB1 is obtained after the CB1 is encoded; in this case, an order X of modulation performed on the EB1 is 256, and a size of the EB1 is 11520 bits. An EB2 is obtained after the CB2 is encoded; in this case, an order X of modulation performed on the EB2 is 256, and a size of the EB2 is 11520 bits. The EB1 is evenly split into three sub-bit blocks that are respectively labeled as a sub-bit block 1, a sub-bit block 2, and a sub-bit block 3 according to a splitting sequence; and the sub-bit block 1, the sub-bit block 2, and the sub-bit block 3 are randomly mapped onto a bit stream 2, a bit stream 3, and a bit stream 1. The EB2 is evenly split into three sub-bit blocks that are respectively labeled as a sub-bit block 4, a sub-bit block 5, and a sub-bit block 6 according to a splitting sequence; and the sub-bit block 4, the sub-bit block 5, and the sub-bit block 6 are respectively mapped onto the bit stream 3, the bit stream 1, and the bit stream 2. A bit size of the bit stream 1 is 7680 bits, a bit size of the bit stream 2 is 7680 bits, and a bit size of the bit stream 3 is 7680 bits.

Optionally, the N encoded bit blocks are pseudorandomly mapped onto at least two of the M bit streams after at least two of the N encoded bit blocks are combined.

Figure 9:
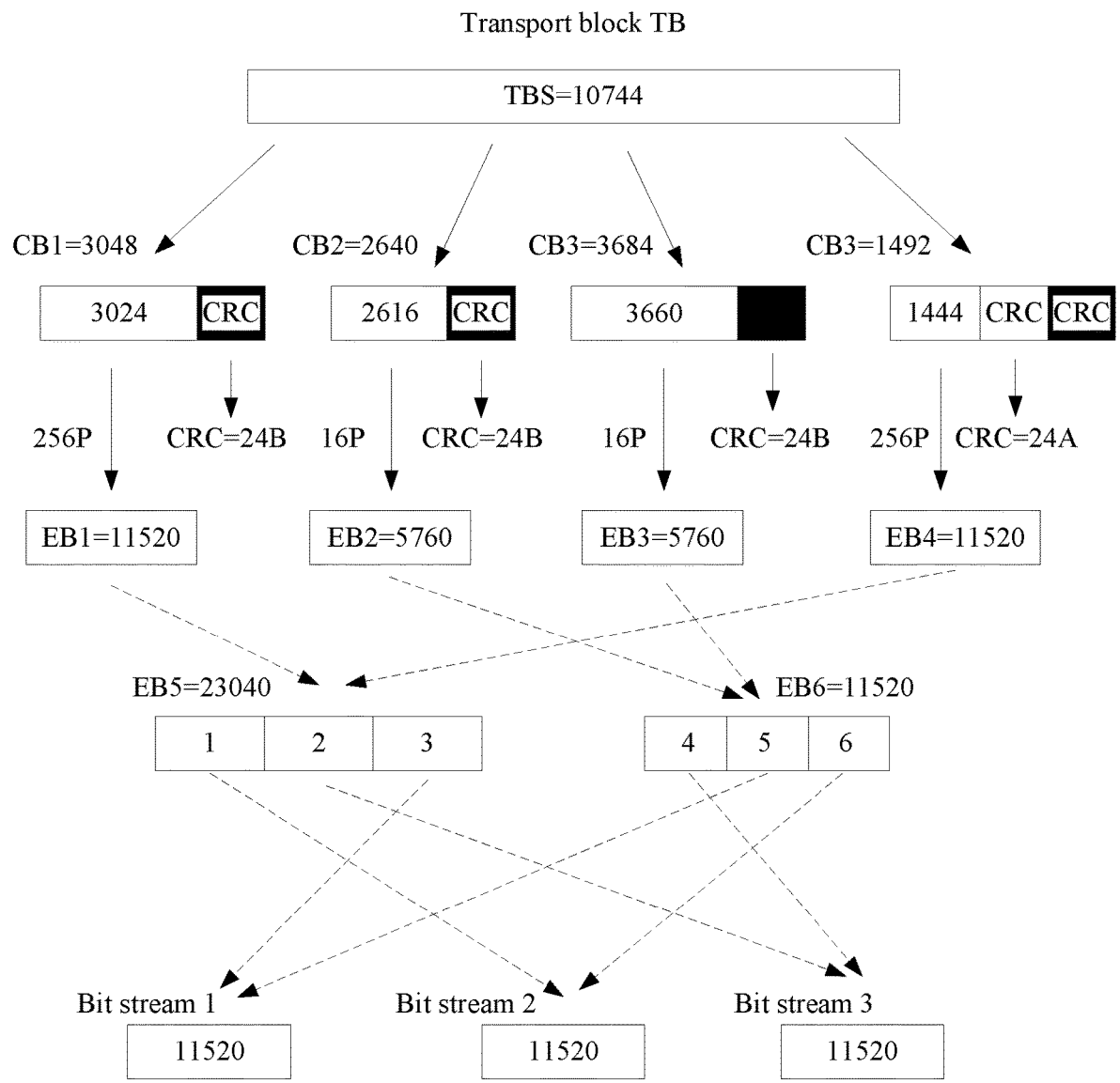
FIG. 9 is another schematic diagram of pseudorandomly mapping an encoded bit block in another modulation scheme according to an embodiment of this application.

For example, when multidimensional modulation is performed on the second bit stream in the M bit streams by using the codebook, as shown in FIG. 9, for a TB whose size is 10744 bits (that is, a TBS is 10744 bits), the TB is unevenly split into four CBs: a CB1, a CB2, a CB3, and a CB4, respectively. A size of the CB1 is 3048 bits, a size of the CB2 is 2640 bits, a size of the CB3 is 3684 bits, and a size of the CB4 is 1492 bits. According to the formula 2, an EB is obtained after a CB is encoded. During this period, the total quantity of time-frequency resources is 1920, the spreading factor F is 4, and the quantity k of bit streams occupied by each encoded bit block is 3. An EB1 is obtained after the CB1 is encoded; in this case, an order X of modulation performed on the EB1 is 256, and a size of the EB1 is 11520 bits. An EB2 is obtained after the CB2 is encoded; in this case, an order X of modulation performed on the EB2 is 16, and a size of the EB2 is 5760 bits. An EB3 is obtained after the CB3 is encoded; in this case, an order X of modulation performed on the EB3 is 16, and a size of the EB3 is 5760 bits. An EB4 is obtained after the CB4 is encoded; in this case, an order X of modulation performed on the EB4 is 256, and a size of the EB4 is 11520 bits. The EB1 and the EB4 are combined to obtain an EB5, and a size of the EB5 is 23040 bits. The EB2 and the EB3 are combined to obtain an EB6, and a size of the EB6 is 11520 bits. The EB5 is evenly split into three sub-bit blocks that are respectively labeled as a sub-bit block 1, a sub-bit block 2, and a sub-bit block 3 according to a splitting sequence; and the sub-bit block 1, the sub-bit block 2, and the sub-bit block 3 are respectively mapped onto a bit stream 2, a bit stream 3, and a bit stream 1. The EB6 is evenly split into three sub-bit blocks that are respectively labeled as a sub-bit block 4, a sub-bit block 5, and a sub-bit block 6 according to a splitting sequence; and the sub-bit block 4, the sub-bit block 5, and the sub-bit block 6 are respectively mapped onto the bit stream 3, the bit stream 1, and the bit stream 2. A bit size of the bit stream 1 is 11520 bits, a bit size of the bit stream 2 is 11520 bits, and a bit size of the bit stream 3 is 11520 bits.

Optionally, the N code blocks are sequentially mapped onto the M bit streams according to an arrangement sequence of bits in each of the N encoded bit blocks.

Figure 10:
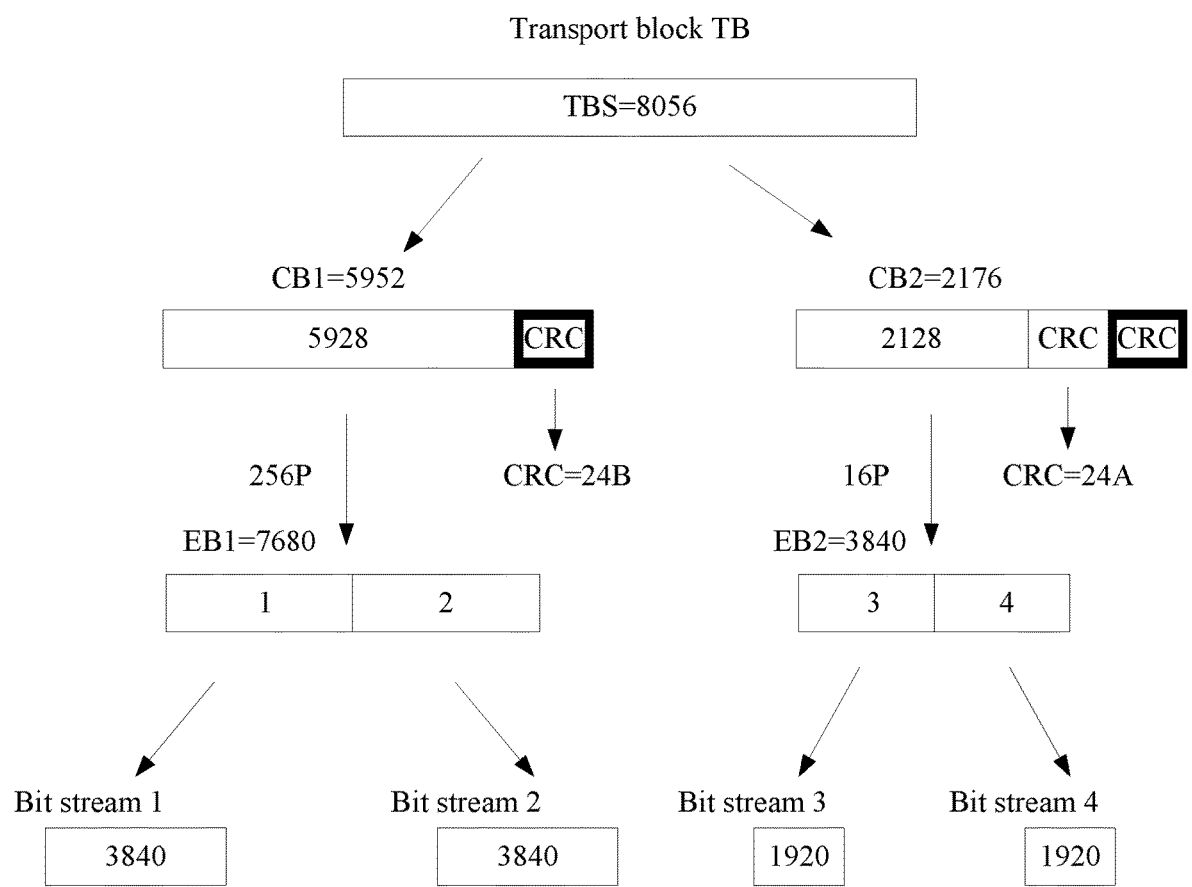
FIG. 10 is a schematic diagram of sequentially mapping an encoded bit block according to an embodiment of this application.

For example, as shown in FIG. 10, for a TB whose size is 8056 bits (that is, a TBS is 8056 bits), the TB is split into two CBs: a CB1 and a CB2, respectively. A size of the CB1 is 5952 bits, and a size of the CB2 is 2176 bits. According to the formula 2, an EB is obtained after a CB is encoded. During this period, the total quantity of time-frequency resources is 1920, the spreading factor F is 4, and the quantity k of bit streams occupied by each encoded bit block is 2. An EB1 is obtained after the CB1 is encoded; in this case, an order X of modulation performed on the EB1 is 256, and a size of the EB1 is 7680 bits. An EB2 is obtained after the CB2 is encoded; in this case, an order X of modulation performed on the EB2 is 16, and a size of the EB2 is 3840 bits. The EB1 is evenly split into two sub-bit blocks that are respectively labeled as a sub-bit block 1 and a sub-bit block 2 according to a splitting sequence, and the sub-bit block 1 and the sub-bit block 2 are respectively mapped onto a bit stream 1 and a bit stream 2. The EB2 is evenly split into two sub-bit blocks that are respectively labeled as a sub-bit block 3 and a sub-bit block 4 according to a splitting sequence, and the sub-bit block 3 and the sub-bit block 4 are respectively mapped onto a bit stream 3 and a bit stream 4. A bit size of the bit stream 1 is 3840 bits, a bit size of the bit stream 2 is 3840 bits, a bit size of the bit stream 3 is 1920 bits, and a bit size of the bit stream 4 is 1920 bits.

Optionally, the N code blocks are sequentially mapped onto the M bit streams according to an arrangement sequence of the N encoded bit blocks.

Figure 11:
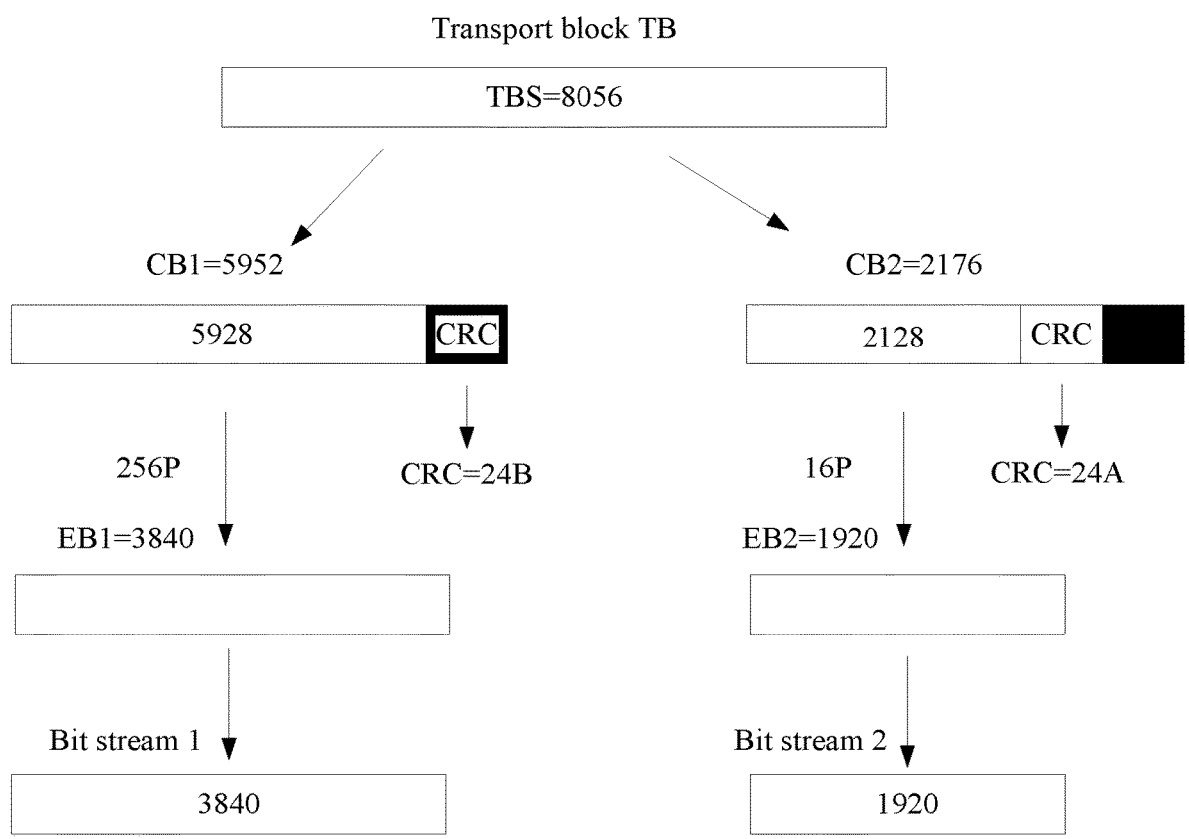
FIG. 11 is another schematic diagram of sequentially mapping an encoded bit block according to an embodiment of this application.

For example, as shown in FIG. 11, for a TB whose size is 8056 bits (that is, a TBS is 8056 bits), the TB is split into two CBs: a CB1 and a CB2, respectively. A size of the CB1 is 5952 bits, and a size of the CB2 is 2176 bits. According to the formula 2, an EB is obtained after a CB is encoded. During this period, the total quantity of time-frequency resources is 1920, the spreading factor F is 4, and the quantity k of bit streams occupied by each encoded bit block is 1. An EB1 is obtained after the CB1 is encoded; in this case, an order X of modulation performed on the EB1 is 256, and a size of the EB1 is 3840 bits. An EB2 is obtained after the CB2 is encoded; in this case, an order X of modulation performed on the EB2 is 16, and a size of the EB2 is 1920 bits. The EB1 is mapped onto a bit stream 1 and the EB2 is mapped onto a bit stream 2 according to an arrangement sequence of the N encoded bit blocks. A bit block size of the bit stream 1 is 3840 bits, and a bit block size of the bit stream 2 is 1920 bits.

Optionally, the N encoded bit blocks are randomly mapped onto the M bit streams. In this case, M=N.

Figure 12:
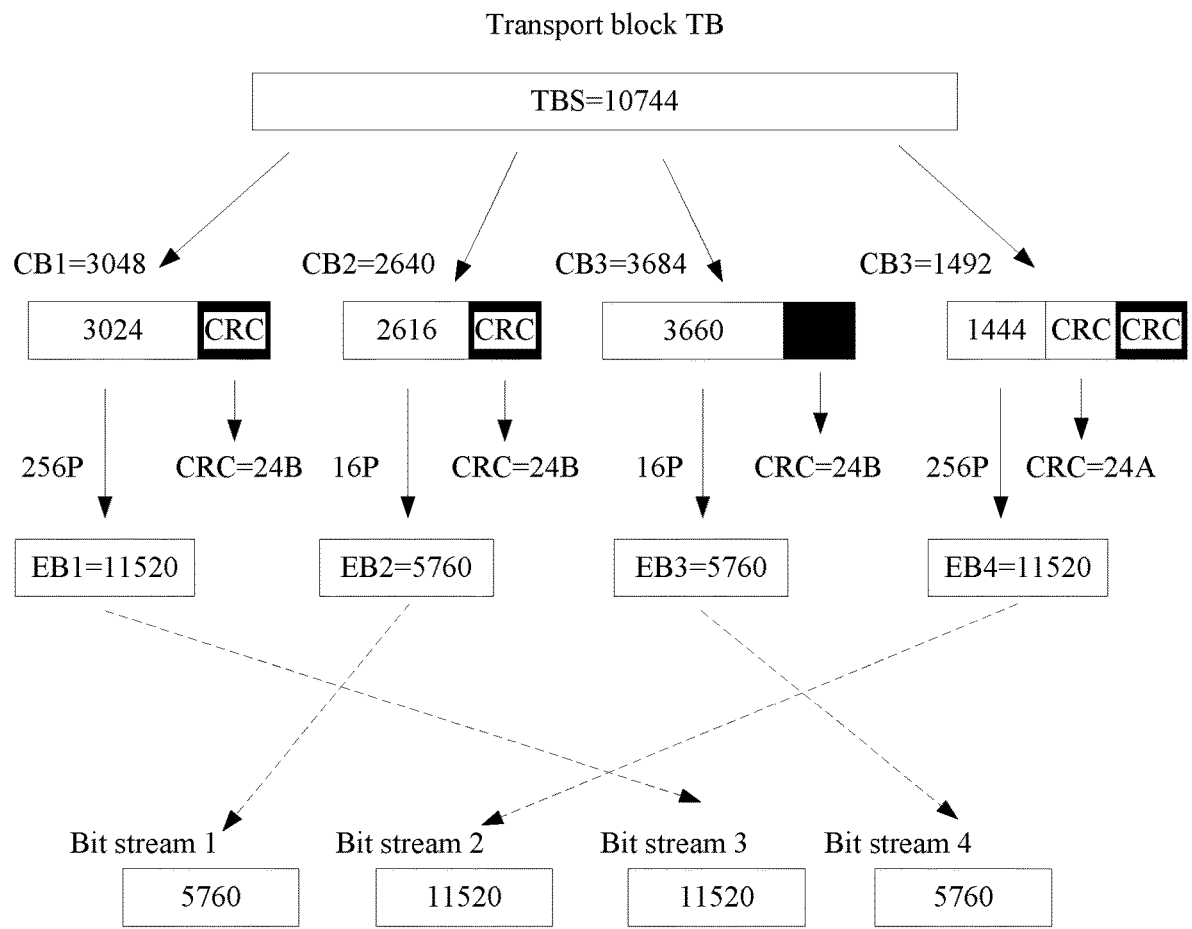
FIG. 12 is a schematic diagram of pseudorandomly mapping an encoded bit block according to an embodiment of this application.

For example, as shown in FIG. 12, for a TB whose size is 10744 bits (that is, a TBS is 10744 bits), the TB is unevenly split into four CBs: a CB1, a CB2, a CB3, and a CB4, respectively. A size of the CB1 is 3048 bits, a size of the CB2 is 2640 bits, a size of the CB3 is 3684 bits, and a size of the CB4 is 1492 bits. According to the formula 2, an EB is obtained after a CB is encoded. During this period, the total quantity of time-frequency resources is 1920, the spreading factor F is 4, and the quantity k of bit streams occupied by each encoded bit block is 3. An EB1 is obtained after the CB1 is encoded; in this case, an order X of modulation performed on the EB1 is 256, and a size of the EB1 is 11520 bits. An EB2 is obtained after the CB2 is encoded; in this case, an order X of modulation performed on the EB2 is 16, and a size of the EB2 is 5760 bits. An EB3 is obtained after the CB3 is encoded; in this case, an order X of modulation performed on the EB3 is 16, and a size of the EB3 is 5760 bits. An EB4 is obtained after the CB4 is encoded; in this case, an order X of modulation performed on the EB4 is 256, and a size of the EB4 is 11520 bits. The EB1 is mapped onto a bit stream 3, the EB2 is mapped onto a bit stream 1, the EB3 is mapped onto a bit stream 4, and the EB4 is mapped onto a bit stream 2.

Optionally, the M bit streams are modulated to obtain the M to-be-transmitted symbol streams. The quantities of modulation symbols in the M to-be-transmitted symbol streams are equal.

Optionally, the M to-be-transmitted symbol streams are superposed to obtain the superposed symbol stream.

Figure 13:
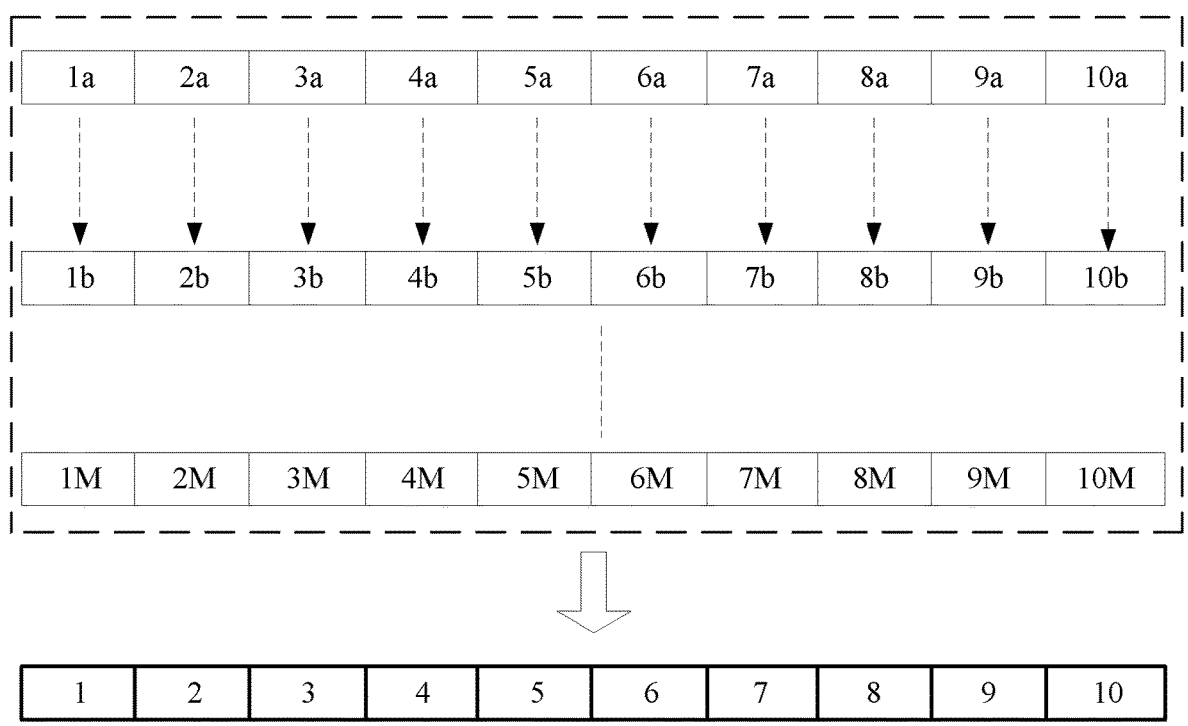
FIG. 13 is a schematic diagram of superposing symbol streams according to an embodiment of this application.

For example, as shown in FIG. 13, each of the M to-be-transmitted symbol streams includes 10 symbols. Symbols in a first to-be-transmitted symbol stream are labeled as 1a, 2a, . . . , and 10a; symbols in a second to-be-transmitted symbol stream are labeled as 1b, 2b, . . . , and 10b; symbols in an $M^{th}$ to-be-transmitted symbol stream are labeled as 1M, 2M, . . . , and 10M; and symbols in the superposed symbol stream are labeled as 1, 2, . . . , and 10. 1a, 1b, . . . , and 1M are superposed to obtain a superposed symbol 1; 2a, 2b, . . . , and 2M are superposed to obtain a superposed symbol 2; and 10a, 10b, . . . , and 10M are superposed to obtain a superposed symbol 10.

Optionally, the superposed symbol stream is a new symbol stream and may be non-orthogonally transmitted by using same time domain resources, frequency domain resources, space domain resources, and code domain resources.

Therefore, in this embodiment of this application, during non-orthogonal data transmission, the to-be-transmitted block is split into the N code blocks with incompletely equal sizes, and error correction coding with different error correction capabilities is performed on the N code blocks, so that performance of all the code blocks is different, and a receive end can gradually demodulate data more easily in an interference cancellation manner, thereby increasing an uplink/downlink data transmission throughput.

In 204, a received signal is obtained by using the resources that are the same in the at least one dimension of the time domain, the frequency domain, the space domain, and the code domain.

In 205, N encoded bit blocks are obtained by demodulating the received signal, where N is an integer greater than or equal to 2.

Optionally, the obtaining N encoded bit blocks by demodulating the received signal includes: obtaining the received signal, where the received signal includes a superposed symbol stream; evenly splitting the superposed symbol stream to obtain M symbol streams, where quantities of symbols included in all of the M symbol streams are equal, and M is an integer greater than or equal to 1; demodulating the M symbol streams to obtain M bit streams; and demapping the M bit streams to obtain the N encoded bit blocks, where N is an integer greater than or equal to 2.

Optionally, bits in the M bit streams are pseudorandomly demapped to obtain the N encoded bit blocks.

Optionally, bits in the M bit streams are sequentially demapped to obtain the N encoded bit blocks.

Optionally, encoded bit blocks in the M bit streams are sequentially mapped onto the N encoded bit blocks according to an arrangement sequence of the encoded bit blocks in the M bit streams.

Optionally, bits in the M bit streams are sequentially mapped onto the N encoded bit blocks according to an arrangement sequence of the bits in the M bit streams.

Optionally, the M symbol streams are demodulated through quadrature amplitude demodulation and/or phase shift demodulation, to obtain the M bit streams.

Optionally, the M symbol streams are demodulated by using a codebook, to obtain the M bit streams, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, demodulation schemes of the M symbol streams are not completely the same.

In 206, error correction decoding is performed on the N encoded bit blocks to obtain N code blocks with incompletely equal sizes.

Optionally, error correction decoding is performed on the N encoded bit blocks by using incompletely same code rates, to obtain the N code blocks with incompletely same sizes.

Optionally, error correction decoding is performed in any one of the following decoding manners: a Turbo code, a polar code, and a low-density parity-check code.

In 207, the N code blocks are combined to obtain a transport block.

Optionally, the N code blocks may be code blocks of incompletely equal sizes.

Therefore, in this embodiment of this application, during non-orthogonal data transmission, the N code blocks with incompletely same sizes are obtained through decoding, so that data is demodulated more easily in an interference cancellation manner, thereby increasing an uplink/downlink data transmission throughput.

Figure 14A:
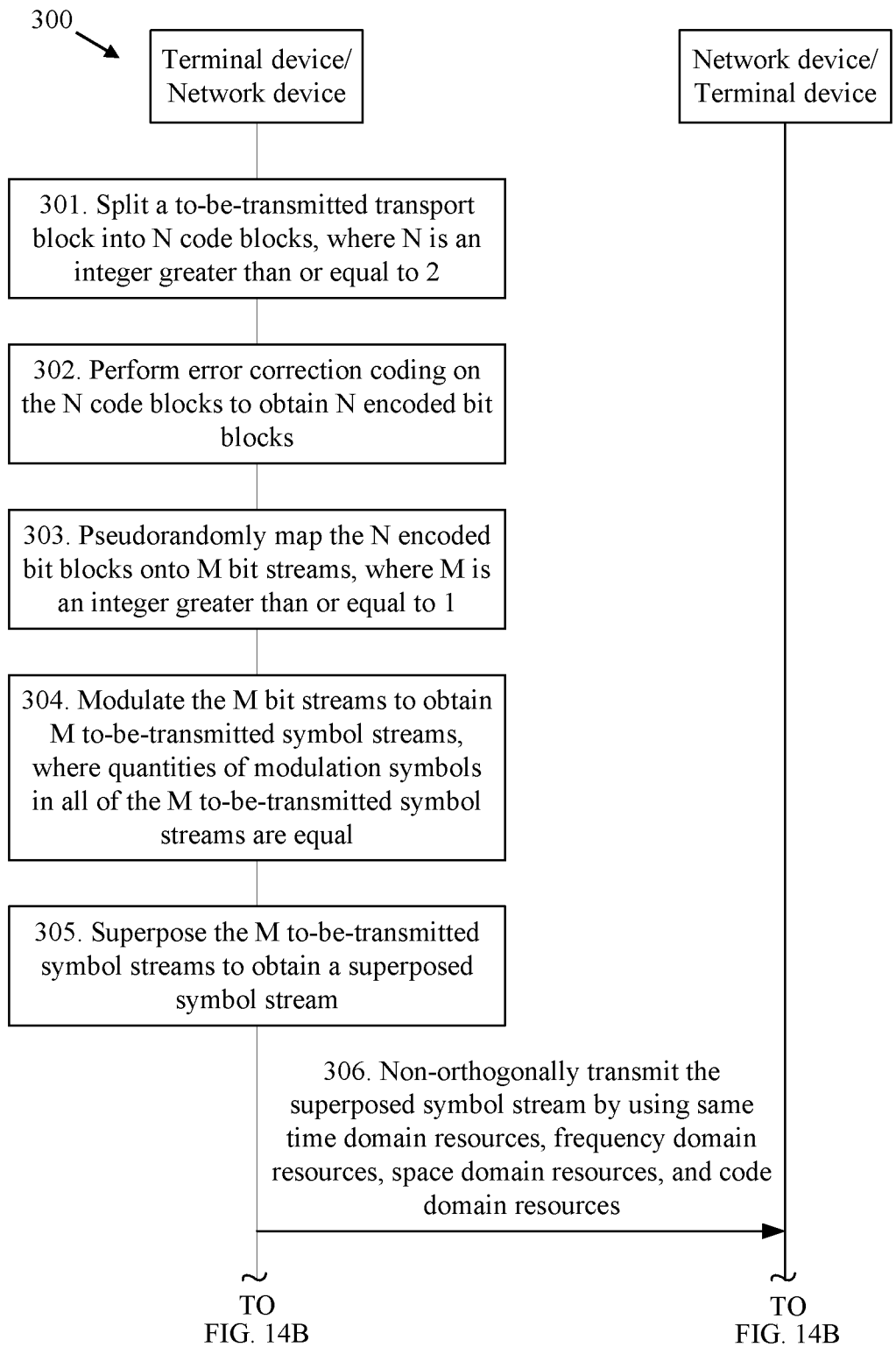
FIG. 14A and FIG. 14B are a schematic flowchart of a non-orthogonal data transmission method according to another embodiment of this application.
Figure 14B:
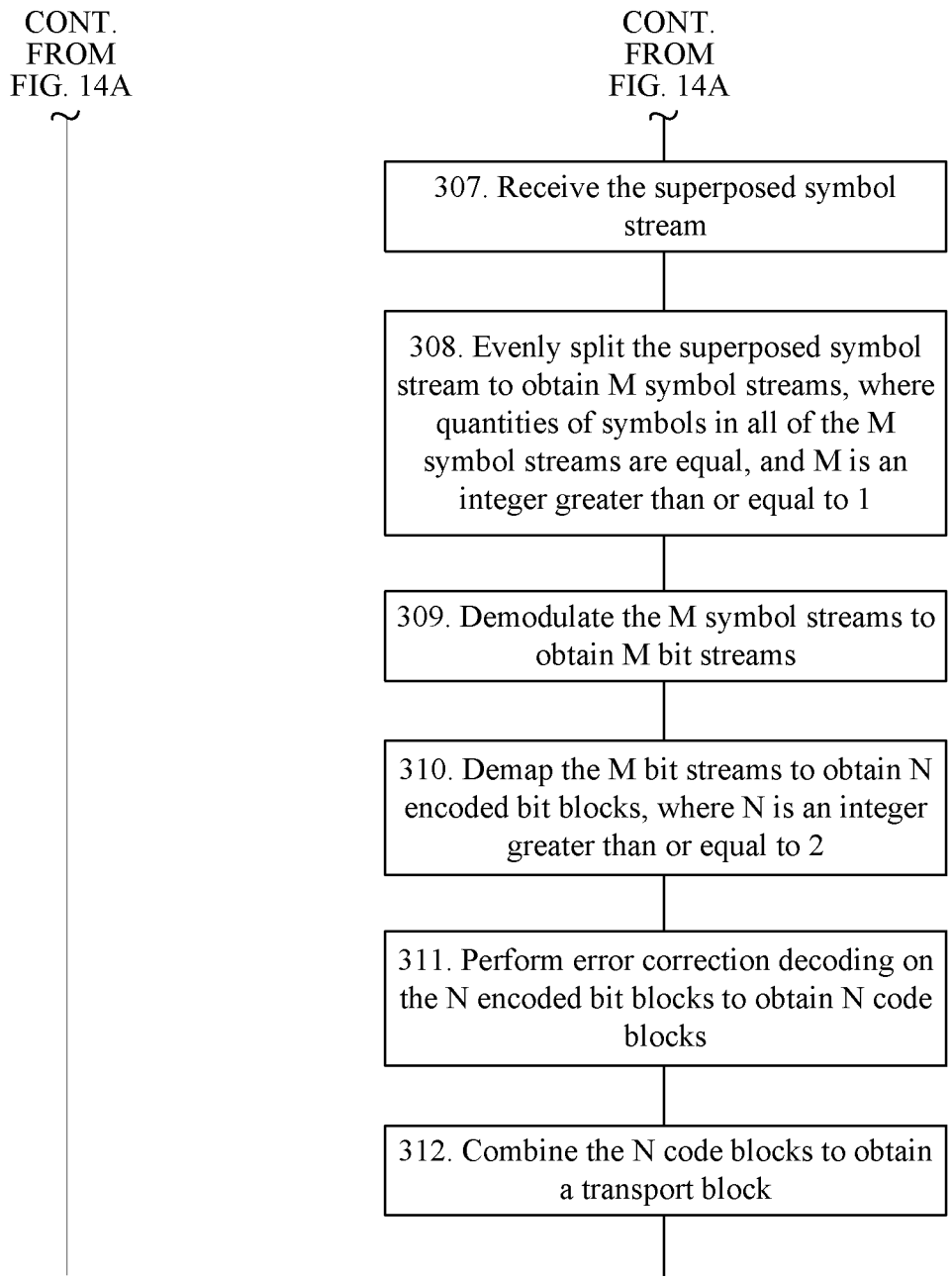

FIG. 14A and FIG. 14B are a schematic flowchart of a non-orthogonal data transmission method 300 according to another embodiment of this application. As shown in FIG. 14A and FIG. 14B, the method 300 includes the following content.

In step 301, a to-be-transmitted transport block is split into N code blocks, where N is an integer greater than or equal to 2.

Optionally, the N code blocks may be code blocks of equal sizes, or may be code blocks of incompletely equal sizes.

In step 302, error correction coding is performed on the N code blocks to obtain N encoded bit blocks.

Optionally, when the N code blocks are code blocks of incompletely equal sizes, error correction coding may be performed on the N code blocks by using incompletely same code rates, to obtain the N encoded bit blocks.

Optionally, error correction coding is performed on each of the N code blocks to obtain the N encoded bit blocks, where error correction coding is performed in any one of the following encoding manners: a Turbo code, a polar code, and a low-density parity-check code.

Optionally, when error correction coding is performed on each of the N code blocks through polar coding, a size of each of the N encoded bit blocks is a power of 2.

In step 303, the N encoded bit blocks are pseudorandomly mapped onto M bit streams, where M is an integer greater than or equal to 1.

Optionally, the N encoded bit blocks are pseudorandomly mapped onto at least two of the M bit streams after each of the N encoded bit blocks is split.

Optionally, the N encoded bit blocks are pseudorandomly mapped onto at least two of the M bit streams after at least two of the N encoded bit blocks are combined.

In step 304, the M bit streams are modulated to obtain M to-be-transmitted symbol streams, where quantities of modulation symbols included in all of the M to-be-transmitted symbol streams are equal.

Optionally, a first bit stream in the M bit streams is modulated through quadrature amplitude modulation and/or phase shift modulation, to obtain the M to-be-transmitted symbol streams.

Optionally, when the first bit stream in the M bit streams is modulated through quadrature amplitude modulation and/or phase shift modulation, a size of an $i^{th}$ encoded bit block $EB_i$ in the N encoded bit blocks may be obtained according to the following formula 1:

$$EB_i = \text{a total quantity of time-frequency resources} \times \log_2(X) \quad \text{Formula 1}$$

where X represents an order of modulation performed on the first bit stream.

Optionally, multidimensional modulation is performed on a second bit stream in the M bit streams by using a codebook, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, when multidimensional modulation is performed on the second bit stream in the M bit streams by using the codebook, a size of an $i^{th}$ encoded bit block $EB_i$ in the N encoded bit blocks may be obtained according to the following formula 2:

$$EB_i = \text{a total quantity of time-frequency resources}/F \times k \times \log_2(X) \quad \text{Formula 2}$$

where F represents a spreading factor, k represents a quantity of bit streams occupied by each encoded bit block, and X represents an order of modulation performed on the second bit stream.

Optionally, modulation schemes of the N code blocks are not completely the same.

In step 305, the M to-be-transmitted symbol streams are superposed to obtain a superposed symbol stream.

In step 306, the superposed symbol stream is non-orthogonally transmitted by using same time domain resources, frequency domain resources, space domain resources, and code domain resources.

Therefore, in this embodiment of this application, during non-orthogonal data transmission, the to-be-transmitted block is split into the N code blocks, and the N encoded bit blocks are pseudorandomly mapped onto the M bit streams, so that performance of all the bit streams is different, thereby increasing an uplink/downlink data transmission throughput.

In step 307, the superposed symbol stream is received.

In step 308, the superposed symbol stream is evenly split to obtain M symbol streams, where quantities of symbols included in all of the M symbol streams are equal, and M is an integer greater than or equal to 1.

In step 309, the M symbol streams are demodulated to obtain M bit streams.

Optionally, the M symbol streams are demodulated through quadrature amplitude demodulation and/or phase shift demodulation, to obtain the M bit streams.

Optionally, the M symbol streams are demodulated by using a codebook, to obtain the M bit streams, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, demodulation schemes of the M symbol streams are not completely the same.

In step 310, the M bit streams are demapped to obtain N encoded bit blocks, where N is an integer greater than or equal to 2.

Optionally, bits in the M bit streams are pseudorandomly demapped to obtain the N encoded bit blocks.

In step 311, error correction decoding is performed on the N encoded bit blocks to obtain N code blocks.

Optionally, error correction decoding is performed on the N encoded bit blocks to obtain the N code blocks, where error correction decoding is performed in any one of the following decoding manners: a Turbo code, a polar code, and a low-density parity-check code.

In step 312, the N code blocks are combined to obtain a transport block.

It should be understood that for each step in a non-orthogonal data transmission method 300 according to another embodiment of this application, reference may be made to a corresponding step in the method 200 in FIG. 2. For brevity, details are not described herein again.

Therefore, in this embodiment of this application, during non-orthogonal data transmission, bit streams with different performance are obtained, so that data is demodulated more easily in an interference cancellation manner, thereby increasing an uplink/downlink data transmission throughput.

Figure 15:
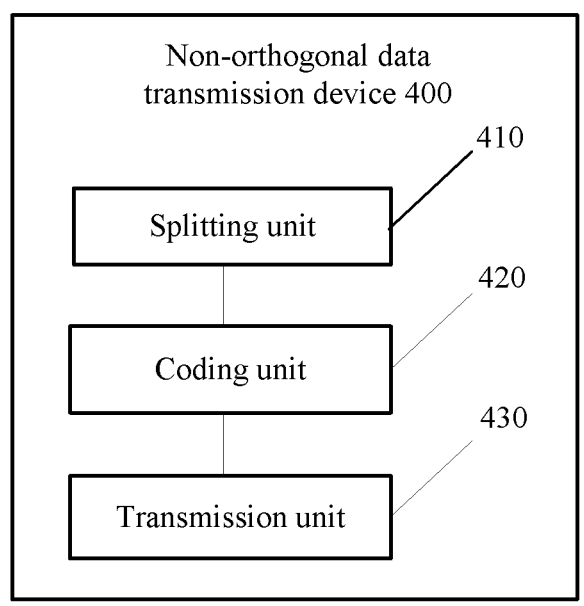
FIG. 15 is a schematic block diagram of a non-orthogonal data transmission device according to an embodiment of this application.

FIG. 15 is a schematic block diagram of a non-orthogonal data transmission device 400 according to an embodiment of this application. As shown in FIG. 15, the device 400 includes:

a splitting unit 410, configured to split a to-be-transmitted transport block into N code blocks with incompletely equal sizes, where N is an integer greater than or equal to 2;

a coding unit 420, configured to perform error correction coding on the N code blocks to obtain N encoded bit blocks; and a transmission unit 430, configured to non-orthogonally transmit the N encoded bit blocks by using resources that are the same in at least one dimension of a time domain, a frequency domain, a space domain, and a code domain.

Optionally, the transmission unit 430 is specifically configured to:

map the N encoded bit blocks onto M bit streams, where M is an integer greater than or equal to 1;

modulate the M bit streams to obtain M to-be-transmitted symbol streams, where quantities of modulation symbols included in all of the M to-be-transmitted symbol streams are equal;

superpose the M to-be-transmitted symbol streams to obtain a superposed symbol stream; and non-orthogonally transmit the superposed symbol stream.

Optionally, the superposed symbol stream is non-orthogonally transmitted by using the resources that are the same in the at least one dimension of the time domain, the frequency domain, the space domain, and the code domain.

Optionally, the transmission unit 430 is specifically configured to:
  pseudorandomly map the N encoded bit blocks onto the M bit streams.

Optionally, the transmission unit 430 is specifically configured to:
  pseudorandomly map the N encoded bit blocks onto at least two of the M bit streams after each of the N encoded bit blocks is split; or
  pseudorandomly map the N encoded bit blocks onto at least two of the M bit streams after at least two of the N encoded bit blocks are combined.

Optionally, the transmission unit 430 is specifically configured to:
  sequentially map the N encoded bit blocks onto the M bit streams according to an arrangement sequence of the N encoded bit blocks and/or an arrangement sequence of bits in each of the N encoded bit blocks.

Optionally, the transmission unit 430 is specifically configured to:
  modulate a first bit stream in the M bit streams through quadrature amplitude modulation and/or phase shift modulation, to obtain the M to-be-transmitted symbol streams.

Optionally, the transmission unit 430 is specifically configured to:
  perform multidimensional modulation on a second bit stream in the M bit streams by using a codebook, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, modulation schemes of the N code blocks are not completely the same.

Optionally, the coding unit 420 is specifically configured to:
  perform error correction coding on the N code blocks by using incompletely same code rates, to obtain the N encoded bit blocks.

Optionally, the coding unit 420 performs error correction coding in any one of the following encoding manners: a Turbo code, a polar code, and a low-density parity-check code.

It should be understood that the foregoing and other operations and/or functions of the units in the non-orthogonal data transmission device 400 according to this embodiment of this application are intended to implement corresponding procedures of a transmit end in the method 200 in FIG. 2. For brevity, details are not described herein again.

Figure 16:
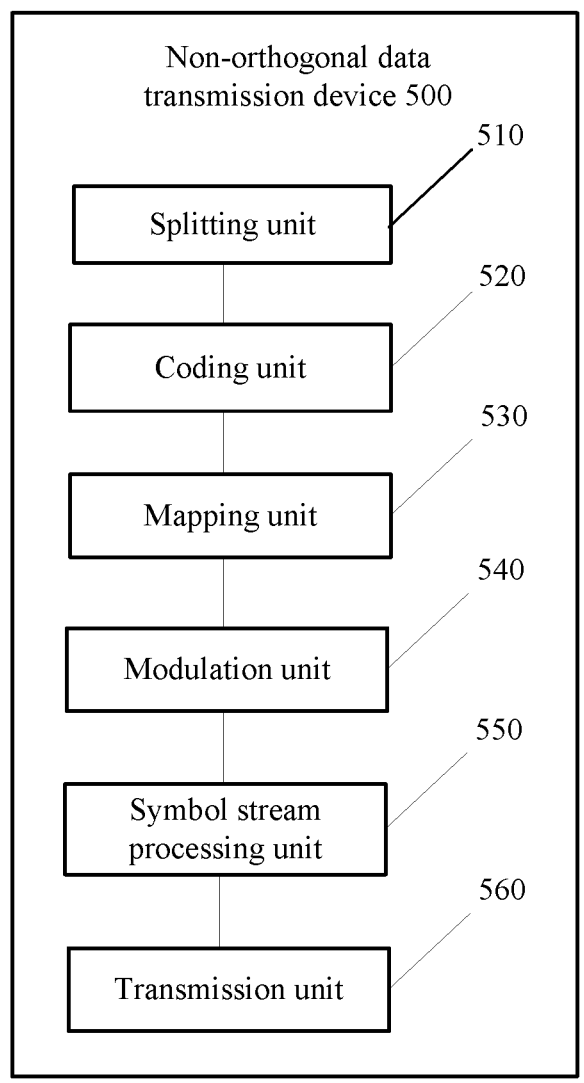
FIG. 16 is a schematic block diagram of a non-orthogonal data transmission device according to another embodiment of this application.

FIG. 16 is a schematic block diagram of a non-orthogonal data transmission device 500 according to another embodiment of this application. As shown in FIG. 16, the device 500 includes:
  a splitting unit 510, configured to split a to-be-transmitted transport block into N code blocks, where N is an integer greater than or equal to 2;
  a coding unit 520, configured to perform error correction coding on the N code blocks to obtain N encoded bit blocks;
  a mapping unit 530, configured to pseudorandomly map the N encoded bit blocks onto M bit streams, where M is an integer greater than or equal to 1;
  a modulation unit 540, configured to modulate the M bit streams to obtain M to-be-transmitted symbol streams, where quantities of modulation symbols included in all of the M to-be-transmitted symbol streams are equal;
  a symbol stream processing unit 550, configured to superpose the M to-be-transmitted symbol streams to obtain a superposed symbol stream; and
  a transmission unit 560, configured to non-orthogonally transmit the superposed symbol stream by using same time domain resources, frequency domain resources, space domain resources, and code domain resources.

Optionally, the mapping unit 530 is specifically configured to:
  pseudorandomly map the N encoded bit blocks onto at least two of the M bit streams after each of the N encoded bit blocks is split; or pseudorandomly map the N encoded bit blocks onto at least two of the M bit streams after at least two of the N encoded bit blocks are combined.

Optionally, the modulation unit 540 is specifically configured to:
  modulate a first bit stream in the M bit streams through quadrature amplitude modulation and/or phase shift modulation, to obtain the M to-be-transmitted symbol streams.

Optionally, when the first bit stream in the M bit streams is modulated through quadrature amplitude modulation and/or phase shift modulation, a size of an $i^{th}$ encoded bit block $EB_i$ in the N encoded bit blocks may be obtained according to the following formula 1:

$$EB_i = \text{a total quantity of time-frequency resources} \times \log_2(X) \quad \text{Formula 1}$$

where X represents an order of modulation performed on the first bit stream.

Optionally, the modulation unit 540 is specifically configured to:
  perform multidimensional modulation on a second bit stream in the M bit streams by using a codebook, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, when multidimensional modulation is performed on the second bit stream in the M bit streams by using the codebook, a size of an $i^{th}$ encoded bit block $EB_i$ in the N encoded bit blocks may be obtained according to the following formula 2:

$$EB_i = \text{a total quantity of time-frequency resources}/F \times k \times \log_2(X) \quad \text{Formula 2}$$

where F represents a spreading factor, k represents a quantity of bit streams occupied by each encoded bit block, and X represents an order of modulation performed on the second bit stream.

Optionally, modulation schemes of the N code blocks are not completely the same.

Optionally, the coding unit 520 is specifically configured to:
  perform error correction coding on the N code blocks by using incompletely same code rates, to obtain the N encoded bit blocks.

Optionally, the coding unit 520 is specifically configured to:
  perform error correction coding on each of the N code blocks to obtain the N encoded bit blocks, where error correction coding is performed in any one of the following encoding manners: a Turbo code, a polar code, and a low-density parity-check code.

It should be understood that the foregoing and other operations and/or functions of the units in a non-orthogonal data transmission device 500 according to this embodiment of this application are intended to implement corresponding procedures of a transmit end in the method 300 in FIG. 14A and FIG. 14B. For brevity, details are not described herein again.

Figure 17:
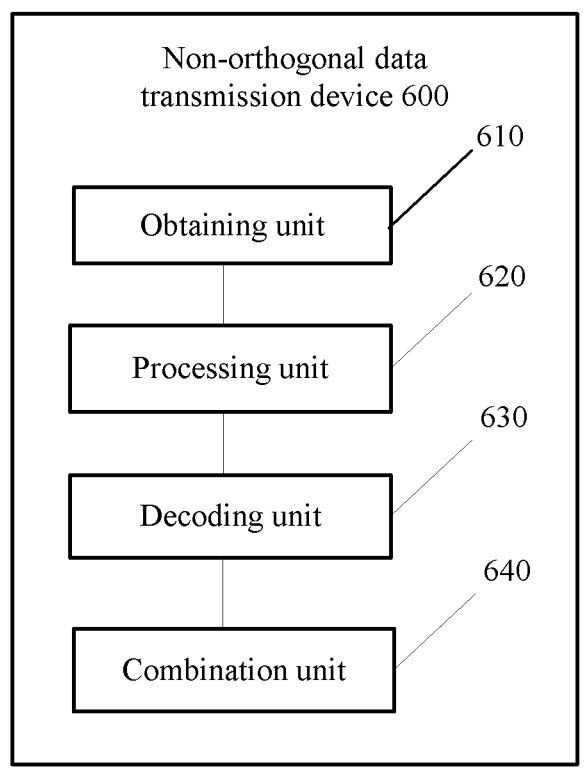
FIG. 17 is a schematic block diagram of a non-orthogonal data transmission device according to an embodiment of this application.

FIG. 17 is a schematic block diagram of a data transmission device 600 according to an embodiment of this application. As shown in FIG. 17, the device 600 includes:

an obtaining unit 610, configured to obtain a received signal by using resources that are the same in at least one dimension of a time domain, a frequency domain, a space domain, and a code domain;

a processing unit 620, configured to obtain N encoded bit blocks by demodulating the received signal, where N is an integer greater than or equal to 2;

a decoding unit 630, configured to perform error correction decoding on the N encoded bit blocks to obtain N code blocks with incompletely same sizes; and a combination unit 640, configured to combine the N code blocks to obtain a transport block.

Optionally, the processing unit 620 is configured to:
obtain the received signal, where the received signal includes a superposed symbol stream; evenly split the superposed symbol stream to obtain M symbol streams, where quantities of symbols included in all of the M symbol streams are equal, and M is an integer greater than or equal to 1; demodulate the M symbol streams to obtain M bit streams; and demap the M bit streams to obtain the N encoded bit blocks, where N is an integer greater than or equal to 2.

Optionally, the processing unit 620 is configured to pseudorandomly demap bits in the M bit streams to obtain the N encoded bit blocks.

Optionally, the processing unit 620 is configured to sequentially demap bits in the M bit streams to obtain the N encoded bit blocks.

Optionally, the processing unit 620 is configured to demodulate the M symbol streams through quadrature amplitude demodulation and/or phase shift demodulation, to obtain the M bit streams.

Optionally, the processing unit 620 is configured to demodulate the M symbol streams by using a codebook, to obtain the M bit streams, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, demodulation schemes of the M symbol streams are not completely the same.

Optionally, the decoding unit 630 is configured to:
perform error correction decoding on the N code blocks by using incompletely same code rates, to obtain the N code blocks with incompletely same sizes.

Optionally, the decoding unit 630 performs error correction decoding in any one of the following decoding manners: a Turbo code, a polar code, and a low-density parity-check code.

It should be understood that the foregoing and other operations and/or functions of the units in a non-orthogonal data transmission device 600 according to this embodiment of this application are intended to implement corresponding procedures of the receive end in the method 200 in FIG. 2. For brevity, details are not described herein again.

Figure 18:
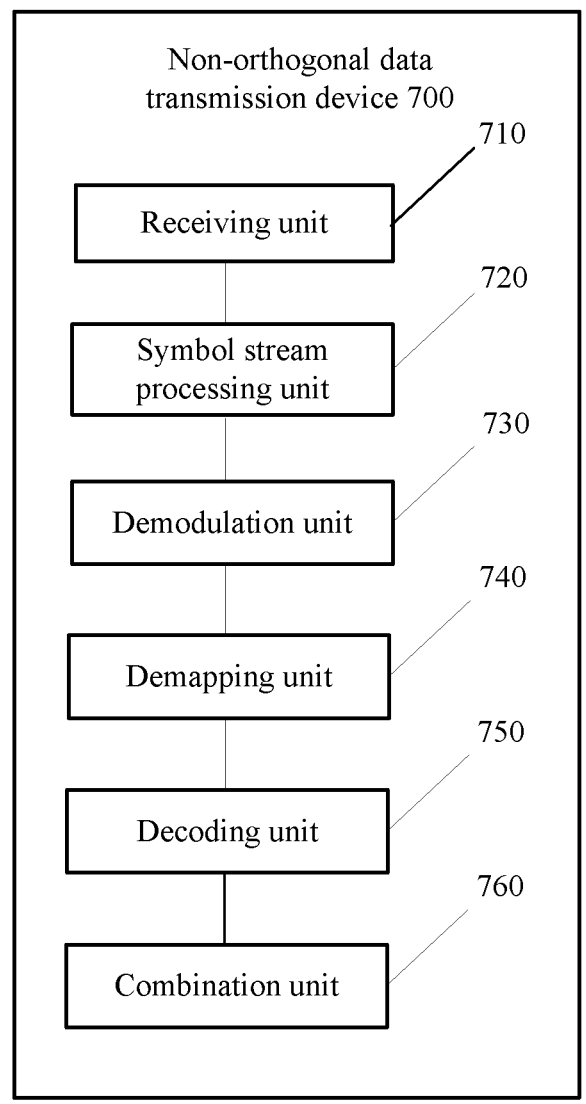
FIG. 18 is a schematic block diagram of a non-orthogonal data transmission device according to another embodiment of this application.

FIG. 18 is a schematic block diagram of a data transmission device 700 according to an embodiment of this application. As shown in FIG. 18, the device 700 includes:

a receiving unit 710, configured to receive a superposed symbol stream;

a symbol stream processing unit 720, configured to evenly split the superposed symbol stream to obtain M symbol streams, where quantities of symbols included in all of the M symbol streams are equal, and M is an integer greater than or equal to 1;

a demodulation unit 730, configured to demodulate the M symbol streams to obtain M bit streams;

a demapping unit 740, configured to demap the M bit streams to obtain N encoded bit blocks, where N is an integer greater than or equal to 2;

a decoding unit 750, configured to perform error correction decoding on the N encoded bit blocks to obtain N code blocks; and a combination unit 760, configured to combine the N code blocks to obtain a transport block.

Optionally, the demapping unit 740 is configured to:
pseudorandomly demap bits in the M bit streams to obtain the N encoded bit blocks.

Optionally, the demapping unit 740 is configured to:
sequentially demap bits in the M bit streams to obtain the N encoded bit blocks.

Optionally, the demodulation unit 730 is configured to:
demodulate the M symbol streams through quadrature amplitude demodulation and/or phase shift demodulation, to obtain the M bit streams.

Optionally, the demodulation unit 730 is configured to:
demodulate the M symbol streams by using a codebook, to obtain the M bit streams, where the codebook includes two or more than two code words, the code word is a multidimensional complex vector and is used to represent mapping relationships between data and at least two modulation symbols, and the at least two modulation symbols include at least one zero modulation symbol and at least one non-zero modulation symbol.

Optionally, demodulation schemes of the M symbol streams are not completely the same.

Optionally, the decoding unit 750 is configured to:
perform error correction decoding on the N encoded bit blocks to obtain the N code blocks, where error correction decoding is performed in any one of the following decoding manners: a Turbo code, a polar code, and a low-density parity-check code.

It should be understood that the foregoing and other operations and/or functions of the units in a non-orthogonal data transmission device 700 according to this embodiment of this application are intended to implement corresponding procedures of the receive end in the method 300 in FIG. 14A and FIG. 14B. For brevity, details are not described herein again.

Figure 19:
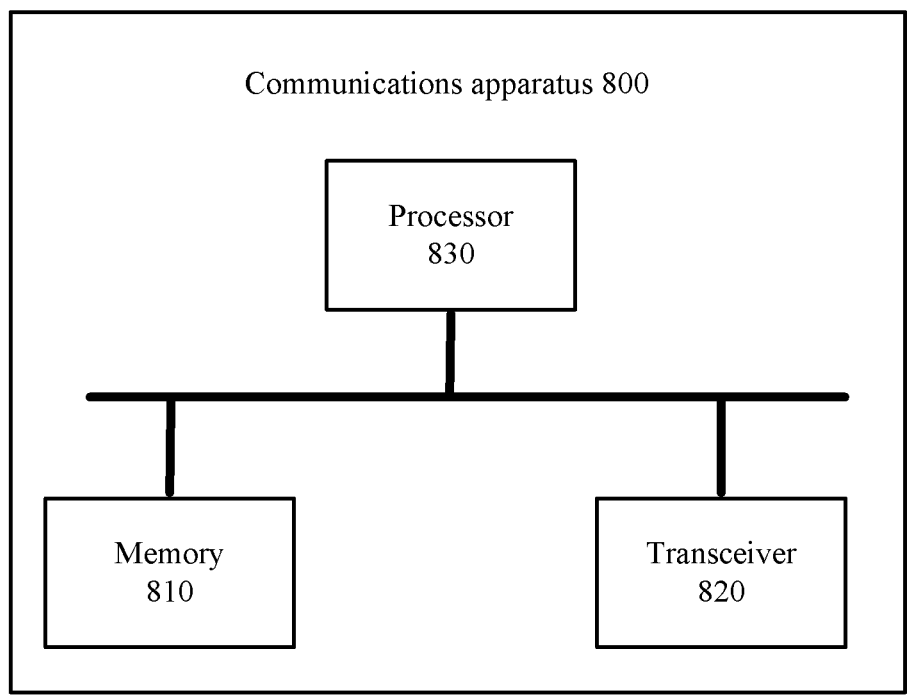
FIG. 19 is a schematic block diagram of a communications apparatus according to an embodiment of this application.

FIG. 19 is a schematic block diagram of a communications apparatus 800 according to an embodiment of this application. The apparatus 800 includes:

a memory 810, configured to store program code;

a transceiver 820, configured to communicate with another device; and a processor 830, configured to execute the program code in the memory 810.

Optionally, when the code is executed, the processor 830 can implement operations performed by a transmit end device in the method 200. For brevity, details are not described herein again. In this case, the communications apparatus 800 may be a terminal device or a network device. The transceiver 820 is configured to perform specific signal transceiving under the driving of the processor 830.

Optionally, when the code is executed, the processor 830 can implement operations performed by a transmit end device in the method 300. For brevity, details are not described herein again. In this case, the communications apparatus 800 may be a terminal device or a network device.

Optionally, when the code is executed, the processor 830 can implement operations performed by a receive end device in the method 200. For brevity, details are not described herein again. In this case, the communications apparatus 800 may be a terminal device or a network device. The transceiver 820 is configured to perform specific signal transceiving under the driving of the processor 830.

Optionally, when the code is executed, the processor 830 can implement operations performed by a receive end device in the method 300. For brevity, details are not described herein again. In this case, the communications apparatus 800 may be a terminal device or a network device.

It should be understood that in this embodiment of this application, the processor 830 may be a central processing unit (CPU), or the processor 830 may be another general-purpose processor, a digital signal processor (DSP), an application-specific integrated circuit (ASIC), a field programmable gate array (FPGA), or another programmable logic device, discrete gate or transistor logic device, a discrete hardware component, or the like. The general-purpose processor may be a microprocessor, or the processor may be any conventional processor or the like.

The memory 810 may include a read-only memory and a random access memory, and provide an instruction and data to the processor 830. A part of the memory 810 may further include a non-volatile random access memory. For example, the memory 810 may further store information of a device type.

The transceiver 820 may be configured to implement signal transmission and reception functions, such as frequency modulation and demodulation functions or up-conversion and down-conversion functions.

In an implementation process, at least one step of the foregoing methods may be implemented by using an integrated logic circuit of hardware in the processor 830, or the at least one step may be implemented by using the integrated logic circuit under the driving of a software instruction. Therefore, the communications apparatus 800 may be a chip or a chip set. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor 830 reads information in the memory and completes the steps in the foregoing methods in combination with hardware of the processor. To avoid repetition, details are not described herein again.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Further embodiments of the present disclosure are provided in the following. It should be noted that the numbering used in the following section does not necessarily need to comply with the numbering used in the previous sections.

Embodiment 1

A non-orthogonal data transmission method, comprising:
splitting a to-be-transmitted transport block into N code blocks with incompletely equal sizes, wherein N is an integer greater than or equal to 2;
performing error correction coding on the N code blocks to obtain N encoded bit blocks; and
non-orthogonally transmitting the N encoded bit blocks by using resources that are the same in at least one dimension of a time domain, a frequency domain, a space domain, and a code domain.

Embodiment 2

The method according to embodiment 1, wherein the non-orthogonally transmitting the N encoded bit blocks comprises:
mapping the N encoded bit blocks onto M bit streams, wherein M is an integer greater than or equal to 1;
modulating the M bit streams to obtain M to-be-transmitted symbol streams, wherein quantities of modulation symbols comprised in all of the M to-be-transmitted symbol streams are equal;
superposing the M to-be-transmitted symbol streams to obtain a superposed symbol stream; and
non-orthogonally transmitting the superposed symbol stream.

Embodiment 3

The method according to embodiment 2, wherein the mapping the N encoded bit blocks onto M bit streams comprises:
pseudorandomly mapping the N encoded bit blocks onto the M bit streams.

Embodiment 4

The method according to embodiment 3, wherein the pseudorandomly mapping the N encoded bit blocks onto the M bit streams comprises:
pseudorandomly mapping each of the N encoded bit blocks onto at least two of the M bit streams after each of the N encoded bit blocks is split; or
pseudorandomly mapping the N encoded bit blocks onto at least two of the M bit streams after at least two of the N encoded bit blocks are combined.

Embodiment 5

The method according to embodiment 2, wherein the mapping the N encoded bit blocks onto M bit streams comprises:
sequentially mapping the N encoded bit blocks onto the M bit streams according to an arrangement sequence of the N encoded bit blocks and/or an arrangement sequence of bits in each of the N encoded bit blocks.

Embodiment 6

The method according to any one of embodiments 2 to 5, wherein the modulating the M bit streams to obtain M to-be-transmitted symbol streams comprises:
modulating a first bit stream in the M bit streams through quadrature amplitude modulation and/or phase shift modulation, to obtain the M to-be-transmitted symbol streams.

Embodiment 7

The method according to any one of embodiments 2 to 5, wherein the modulating the M bit streams to obtain M to-be-transmitted symbol streams comprises:
performing multidimensional modulation on a second bit stream in the M bit streams by using a codebook, wherein the codebook consists of two or more than two code words, the code word is a multidimensional complex vector and is used to represent mapping relationships between data and at least two modulation symbols, and the at least two modulation symbols comprise at least one zero modulation symbol and at least one non-zero modulation symbol.

Embodiment 8

The method according to any one of embodiments 2 to 7, wherein modulation schemes of the N code blocks are not completely the same.

Embodiment 9

The method according to any one of embodiments 1 to 8, wherein the performing error correction coding on the N code blocks to obtain N encoded bit blocks comprises:
performing error correction coding on the N code blocks by using incompletely same code rates, to obtain the N encoded bit blocks.

Embodiment 10

A non-orthogonal data transmission method, comprising:
obtaining a received signal by using resources that are the same in at least one dimension of a time domain, a frequency domain, a space domain, and a code domain;
obtaining N encoded bit blocks by demodulating the received signal, wherein N is an integer greater than or equal to 2;
performing error correction decoding on the N encoded bit blocks to obtain N code blocks with incompletely same sizes; and
combining the N code blocks to obtain a transport block.

Embodiment 11

The method according to embodiment 10, wherein the obtaining N encoded bit blocks by demodulating the received signal comprises:
obtaining the received signal, wherein the received signal comprises a superposed symbol stream;
evenly splitting the superposed symbol stream to obtain M symbol streams, wherein quantities of symbols comprised in all of the M symbol streams are equal, and M is an integer greater than or equal to 1;
demodulating the M symbol streams to obtain M bit streams; and
demapping the M bit streams to obtain the N encoded bit blocks, wherein N is an integer greater than or equal to 2.

Embodiment 12

The method according to embodiment 11, wherein the demapping the M bit streams to obtain N encoded bit blocks comprises:
pseudorandomly demapping bits in the M bit streams to obtain the N encoded bit blocks; or
sequentially demapping bits in the M bit streams to obtain the N encoded bit blocks.

Embodiment 13

The method according to embodiment 11 or 12, wherein the demodulating the M symbol streams to obtain M bit streams comprises:
demodulating the M symbol streams through quadrature amplitude demodulation and/or phase shift demodulation, to obtain the M bit streams.

Embodiment 14

The method according to embodiment 11 or 12, wherein the demodulating the M symbol streams to obtain M bit streams comprises:
demodulating the M symbol streams by using a codebook, to obtain the M bit streams, wherein the codebook consists of two or more than two code words, the code word is a multidimensional complex vector and is used to represent mapping relationships between data and at least two modulation symbols, and the at least two modulation symbols comprise at least one zero modulation symbol and at least one non-zero modulation symbol.

Embodiment 15

The method according to any one of embodiments 11 to 14, wherein demodulation schemes of the M symbol streams are not completely the same.

Embodiment 16

The method according to any one of embodiments 10 to 15, wherein error correction decoding is performed on the N encoded bit blocks by using incompletely same code rates, to obtain the N code blocks with incompletely same sizes.

Embodiment 17

A non-orthogonal data transmission device, comprising:
a splitting unit, configured to split a to-be-transmitted transport block into N code blocks with incompletely equal sizes, wherein N is an integer greater than or equal to 2;
a coding unit, configured to perform error correction coding on the N code blocks to obtain N encoded bit blocks; and
a transmission unit, configured to non-orthogonally transmit the N encoded bit blocks by using resources that are the same in at least one dimension of a time domain, a frequency domain, a space domain, and a code domain.

Embodiment 18

The device according to embodiment 17, wherein the transmission unit is specifically configured to:
  map the N encoded bit blocks onto M bit streams, wherein M is an integer greater than or equal to 1;
  modulate the M bit streams to obtain M to-be-transmitted symbol streams, wherein quantities of modulation symbols comprised in all of the M to-be-transmitted symbol streams are equal;
  superpose the M to-be-transmitted symbol streams to obtain a superposed symbol stream; and
  non-orthogonally transmit the superposed symbol stream.

Embodiment 19

The device according to embodiment 18, wherein the transmission unit is specifically configured to:
  pseudorandomly map the N encoded bit blocks onto the M bit streams.

Embodiment 20

The device according to embodiment 19, wherein the transmission unit is specifically configured to:
  pseudorandomly map the N encoded bit blocks onto at least two of the M bit streams after each of the N encoded bit blocks is split; or
  pseudorandomly map the N encoded bit blocks onto at least two of the M bit streams after at least two of the N encoded bit blocks are combined.

Embodiment 21

The device according to embodiment 18, wherein the transmission unit is specifically configured to:
  sequentially map the N encoded bit blocks onto the M bit streams according to an arrangement sequence of the N encoded bit blocks and/or an arrangement sequence of bits in each of the N encoded bit blocks.

Embodiment 22

The device according to any one of embodiments 18 to 21, wherein the transmission unit is specifically configured to:
  modulate a first bit stream in the M bit streams through quadrature amplitude modulation and/or phase shift modulation, to obtain the M to-be-transmitted symbol streams.

Embodiment 23

The device according to any one of embodiments 18 to 21, wherein the transmission unit is specifically configured to:
  perform multidimensional modulation on a second bit stream in the M bit streams by using a codebook, wherein the codebook consists of two or more than two code words, the code word is a multidimensional complex vector and is used to represent mapping relationships between data and at least two modulation symbols, and the at least two modulation symbols comprise at least one zero modulation symbol and at least one non-zero modulation symbol.

Embodiment 24

The device according to any one of embodiments 18 to 23, wherein modulation schemes of the N code blocks are not completely the same.

Embodiment 25

The device according to any one of embodiments 17 to 24, wherein the coding unit is specifically configured to:
  perform error correction coding on the N code blocks by using incompletely same code rates, to obtain the N encoded bit blocks.

Embodiment 26

A non-orthogonal data transmission device, comprising:
  an obtaining unit, configured to obtain a received signal by using resources that are the same in at least one dimension of a time domain, a frequency domain, a space domain, and a code domain, wherein the received signal comprises a superposed symbol stream;
  a processing unit, configured to obtain N encoded bit blocks by demodulating the received signal, wherein N is an integer greater than or equal to 2;
  a decoding unit, configured to perform error correction decoding on the N encoded bit blocks to obtain N code blocks with incompletely equal sizes; and
  a combination unit, configured to combine the N code blocks to obtain a transport block.

Embodiment 27

The device according to embodiment 26, wherein the processing unit is specifically configured to:
  obtain the superposed symbol stream in the received signal; evenly split the superposed symbol stream to obtain M symbol streams, wherein quantities of symbols comprised in all of the M symbol streams are equal, and M is an integer greater than or equal to 1; demodulate the M symbol streams to obtain M bit streams; and demap the M bit streams to obtain the N encoded bit blocks, wherein N is an integer greater than or equal to 2.

Embodiment 28

The device according to embodiment 27, wherein the processing unit is specifically configured to:
  pseudorandomly demap bits in the M bit streams to obtain the N encoded bit blocks; or
  sequentially demap bits in the M bit streams to obtain the N encoded bit blocks.

Embodiment 29

The device according to embodiment 27 or 28, wherein the processing unit is specifically configured to:
  demodulate the M symbol streams through quadrature amplitude demodulation and/or phase shift demodulation, to obtain the M bit streams.

Embodiment 30

The device according to embodiment 27 or 28, wherein the processing unit is specifically configured to:
demodulate the M symbol streams by using a codebook, to obtain the M bit streams, wherein the codebook consists of two or more than two code words, the code word is a multidimensional complex vector and is used to represent mapping relationships between data and at least two modulation symbols, and the at least two modulation symbols comprise at least one zero modulation symbol and at least one non-zero modulation symbol.

Embodiment 31

The device according to any one of embodiments 27 to 30, wherein demodulation schemes of the M symbol streams are not completely the same.

Embodiment 32

The device according to any one of embodiments 26 to 31, wherein the decoding unit is specifically configured to:
perform error correction decoding on the N code blocks by using incompletely same code rates, to obtain the N code blocks with incompletely same sizes.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A non-orthogonal data transmission device, comprising:
a processor; and
a transmitter,
wherein the processor is configured to:
split a to-be-transmitted transport block into N code blocks having different sizes, wherein N is an integer greater than or equal to 2; and
perform error correction coding on the N code blocks to obtain N encoded bit blocks;
wherein the transmitter is configured to non-orthogonally transmit the N encoded bit blocks using resources that are the same in at least one dimension of a time domain, a frequency domain, a space domain, and a code domain;
wherein the processor is further configured to:
map the N encoded bit blocks onto M bit streams, wherein M is an integer greater than or equal to 1;
modulate the M bit streams to obtain M to-be-transmitted symbol streams, wherein quantities of modulation symbols comprised in each of the M to-be-transmitted symbol streams are equal; and
superpose the M to-be-transmitted symbol streams to obtain a superposed symbol stream;
wherein the transmitter is further configured to non-orthogonally transmit the superposed symbol stream;
wherein the processor is further configured to perform multidimensional modulation on a second bit stream in the M bit streams using a codebook, wherein the codebook comprises two or more code words, is a multidimensional complex vector and represents mapping relationships between data and at least two modulation symbols, and the at least two modulation symbols comprise at least one zero modulation symbol and at least one non-zero modulation symbol.

2. The device according to claim 1, wherein the processor is further configured to:
map the N encoded bit blocks onto the M bit streams based at least in part on random mapping.

3. The device according to claim 2, wherein the processor is further configured to:
map the N encoded bit blocks onto at least two of the M bit streams after each of the N encoded bit blocks is split based at least in part on random mapping.

4. The device according to claim 2, wherein the processor is further configured to:
sequentially map the N encoded bit blocks onto the M bit streams according to one or more of: an arrangement sequence of the N encoded bit blocks or an arrangement sequence of bits in each of the N encoded bit blocks.

5. The device according to claim 1, wherein the processor is further configured to:
modulate a first bit stream in the M bit streams through one or more of: quadrature amplitude modulation or phase shift modulation, to obtain the M to-be-transmitted symbol streams.

6. The device according to claim 1, wherein modulation schemes of the N code blocks are not completely the same.

7. The device according to claim 1, wherein the processor is further configured to:
perform error correction coding on the N code blocks by using code rates that are not completely the same, to obtain the N encoded bit blocks.

8. A non-orthogonal data transmission device, comprising:
a receiver configured to receive a received signal using resources that are the same in at least one dimension of a time domain, a frequency domain, a space domain, and a code domain, wherein the received signal comprises a superposed symbol stream; and
a processor configured to:
obtain N encoded bit blocks by demodulating the received signal, wherein N is an integer greater than or equal to 2;

perform error correction decoding on the N encoded bit blocks to obtain N code blocks having different sizes;

combine the N code blocks to obtain a transport block;

obtain the superposed symbol stream in the received signal;

evenly split the superposed symbol stream to obtain M symbol streams, wherein quantities of symbols comprised in each of the M symbol streams are equal, and M is an integer greater than or equal to 1;

demodulate the M symbol streams to obtain M bit streams;

demap the M bit streams to obtain the N encoded bit blocks, wherein N is an integer greater than or equal to 2; and demodulate the M symbol streams using a codebook, to obtain the M bit streams, wherein the codebook comprises two or more code words, wherein each code word of the two or more code words is a multidimensional complex vector and represents mapping relationships between data and at least two modulation symbols, and the at least two modulation symbols comprise at least one zero modulation symbol and at least one non-zero modulation symbol.

9. The device according to claim 8, wherein the processor is further configured to:

demap bits in the M bit streams to obtain the N encoded bit blocks based at least in part on random demapping.

10. The device according to claim 8, wherein the processor is further configured to:

demodulate the M symbol streams through one or more of: quadrature amplitude demodulation or phase shift demodulation, to obtain the M bit streams.

11. The device according to claim 8, wherein demodulation schemes of the M symbol streams are not completely the same.

12. The device according to claim 8, wherein the processor is further configured to:

perform error correction decoding on the N code blocks using code rates that are not completely the same, to obtain the N code blocks with incompletely same sizes.

13. The device according to claim 2, wherein the processor is further configured to:

map the N encoded bit blocks onto at least two of the M bit streams after at least two of the N encoded bit blocks are combined based at least in part on random mapping.

14. The device according to claim 8, wherein the processor is further configured to:

sequentially demap bits in the M bit streams to obtain the N encoded bit blocks.

\* \* \* \* \*

UNITED STATES PATENT AND TRADEMARK OFFICE
CERTIFICATE OF CORRECTION

PATENT NO. : 10,924,211 B2  
APPLICATION NO. : 16/452107  
DATED : February 16, 2021  
INVENTOR(S) : Wang et al.

Page 1 of 1

It is certified that error appears in the above-identified patent and that said Letters Patent is hereby corrected as shown below:

On the Title Page

Page 2, item (56) Other Publications Citation No. 2: "Xu et all;" should read -- Xu et al. --.

Page 2, item (56) Other Publications Citation No. 3: "Chunlin Yan, et. all;" should read -- Chunlin Yan, et al. --.

Signed and Sealed this  
Twelfth Day of July, 2022

Katherine Kelly Vidal  
*Director of the United States Patent and Trademark Office*